US011021211B2

(12) United States Patent
Foley et al.

(10) Patent No.: US 11,021,211 B2
(45) Date of Patent: Jun. 1, 2021

(54) ELECTRIC ASSIST BICYCLE

(71) Applicant: NEUTRON HOLDINGS, INC., San Francisco, CA (US)

(72) Inventors: Nicholas Foley, Brooklyn, NY (US); Jacob Bouchard, Brooklyn, NY (US)

(73) Assignee: NEUTRON HOLDINGS, INC., San Francisco, CA (US)

( * ) Notice: Subject to any disclaimer, the term of this patent is extended or adjusted under 35 U.S.C. 154(b) by 383 days.

(21) Appl. No.: 16/016,470

(22) Filed: Jun. 22, 2018

(65) Prior Publication Data

US 2018/0370594 A1 Dec. 27, 2018

Related U.S. Application Data

(60) Provisional application No. 62/524,092, filed on Jun. 23, 2017.

(51) Int. Cl.
*B62M 6/60* (2010.01)
*B62K 19/40* (2006.01)
(Continued)

(52) U.S. Cl.
CPC ............... *B62M 6/60* (2013.01); *B62H 5/00* (2013.01); *B62J 1/08* (2013.01); *B62J 7/06* (2013.01); *B62J 9/21* (2020.02); *B62J 23/00* (2013.01); *B62J 99/00* (2013.01); *B62K 3/06* (2013.01); *B62K 19/02* (2013.01); *B62K 19/06* (2013.01); *B62K 19/32* (2013.01); *B62K 19/36* (2013.01);
(Continued)

(58) Field of Classification Search
CPC . B62K 23/06; B62J 11/13; B62J 45/20; B62J 50/20; B62J 2001/085; B62H 2003/005; Y02T 10/7072; Y02T 90/14; Y02T 10/70
See application file for complete search history.

(56) References Cited

U.S. PATENT DOCUMENTS 7,114,738 B1 * 10/2006 Chen ..................... B62K 19/30
280/281.1
7,192,044 B2 * 3/2007 Ueno ..................... B62K 21/06
280/280
(Continued)

FOREIGN PATENT DOCUMENTS

CN 201694345 * 1/2011
CN 201694345 U 1/2011
(Continued)

OTHER PUBLICATIONS

PCT International Search Report in PCT/US2018/039151, dated Oct. 18, 2018, 14 pages.
(Continued)

*Primary Examiner* — Minnah L Seoh
*Assistant Examiner* — Marlon A Arce
(74) *Attorney, Agent, or Firm* — Dentons US LLP

(57) ABSTRACT

Embodiments disclosed herein include an electric assist bicycle adapted for a both personal and public use, and subcomponents of the bicycle. The electric assist bicycle can include a hollow frame with one or more cables routed within the hollow frame. The hollow frame can be configured with an internal battery compartment. The electric assist bicycle can further include a modular electronic locking system.

18 Claims, 19 Drawing Sheets

(51) Int. Cl.

| | |
|---|---|
| B62K 19/32 | (2006.01) |
| B62K 19/02 | (2006.01) |
| B62M 6/90 | (2010.01) |
| B62K 19/36 | (2006.01) |
| B62J 1/08 | (2006.01) |
| B62M 6/85 | (2010.01) |
| B62H 5/00 | (2006.01) |
| B62L 3/02 | (2006.01) |
| B62M 25/02 | (2006.01) |
| B62J 99/00 | (2020.01) |
| B62J 23/00 | (2006.01) |
| B62K 23/06 | (2006.01) |
| B62K 3/06 | (2006.01) |
| B62K 21/02 | (2006.01) |
| B62M 25/04 | (2006.01) |
| B62J 7/06 | (2006.01) |
| B62K 21/04 | (2006.01) |
| B62M 6/65 | (2010.01) |
| B62K 21/18 | (2006.01) |
| B62K 19/44 | (2006.01) |
| B62K 19/06 | (2006.01) |
| B62J 9/21 | (2020.01) |
| B62H 3/00 | (2006.01) |
| B62J 11/13 | (2020.01) |
| B62J 45/20 | (2020.01) |
| B62J 50/20 | (2020.01) |

(52) U.S. Cl.
CPC ............ *B62K 19/40* (2013.01); *B62K 19/44* (2013.01); *B62K 21/02* (2013.01); *B62K 21/04* (2013.01); *B62K 21/18* (2013.01); *B62K 23/06* (2013.01); *B62L 3/02* (2013.01); *B62M 6/65* (2013.01); *B62M 6/85* (2013.01); *B62M 6/90* (2013.01); *B62M 25/02* (2013.01); *B62M 25/04* (2013.01); *B62H 2003/005* (2013.01); *B62J 11/13* (2020.02); *B62J 45/20* (2020.02); *B62J 50/20* (2020.02); *B62J 2001/085* (2013.01)

(56) References Cited

U.S. PATENT DOCUMENTS

| | | | | |
|---|---|---|---|---|
| 8,297,143 | B2* | 10/2012 | Fujii | B62M 25/04 74/473.13 |
| 9,013,301 | B2 | 4/2015 | Williams | |
| 9,650,103 | B2* | 5/2017 | Perkins | B62M 17/00 |
| 10,370,054 | B2* | 8/2019 | Wen | B62K 21/12 |
| 10,730,584 | B2* | 8/2020 | Ragland | B62M 6/90 |
| 2005/0280244 | A1* | 12/2005 | Watarai | B62J 99/00 280/288.4 |
| 2006/0145446 | A1* | 7/2006 | Schmider | B62K 19/30 280/281.1 |
| 2007/0175290 | A1* | 8/2007 | Fujii | B62M 25/04 74/502.2 |
| 2008/0048412 | A1* | 2/2008 | Dror | B62H 1/02 280/288.3 |
| 2010/0194182 | A1* | 8/2010 | Katz | B62K 25/30 301/109 |
| 2011/0121538 | A1 | 5/2011 | Giroux | |
| 2012/0011957 | A1 | 1/2012 | Domahidy | |
| 2013/0292213 | A1* | 11/2013 | Coombes | B62L 3/04 188/24.11 |
| 2015/0008059 | A1 | 1/2015 | Douglas et al. | |
| 2016/0056432 | A1* | 2/2016 | Searles | B60L 58/12 701/22 |
| 2016/0221632 | A1 | 8/2016 | Fujiwara et al. | |
| 2018/0301035 | A1* | 10/2018 | Tetsuka | H04B 1/04 |

FOREIGN PATENT DOCUMENTS

| | | |
|---|---|---|
| CN | 102837777 | 12/2012 |
| CN | 102837777 A | 12/2012 |
| CN | 203473119 U | 3/2014 |
| CN | 204161580 U | 2/2015 |
| CN | 204659946 U | 9/2015 |
| CN | 105836028 A | 8/2016 |
| EP | 2167327 A1 | 3/2010 |
| EP | 3172120 AO | 5/2017 |
| KR | 10-2009-0021437 | 3/2009 |
| WO | 2009009912 A1 | 1/2009 |
| WO | 2009146551 A | 12/2009 |
| WO | 2014063593 A1 | 5/2014 |
| WO | 2015180756 A1 | 12/2015 |

OTHER PUBLICATIONS

PCT International Preliminary Report on Patentability in PCT/US2018/039151, dated Dec. 24, 2019, 13 pages.
European Search Report and Opinion, Application No. 18 821 264.1 dated (Feb. 4, 2021).
Chinese Office Action for Application No. 20180042098.3 dated (Mar. 2, 2021) with associated Search Report.

* cited by examiner

*FIG. 1* — *Prior Art*

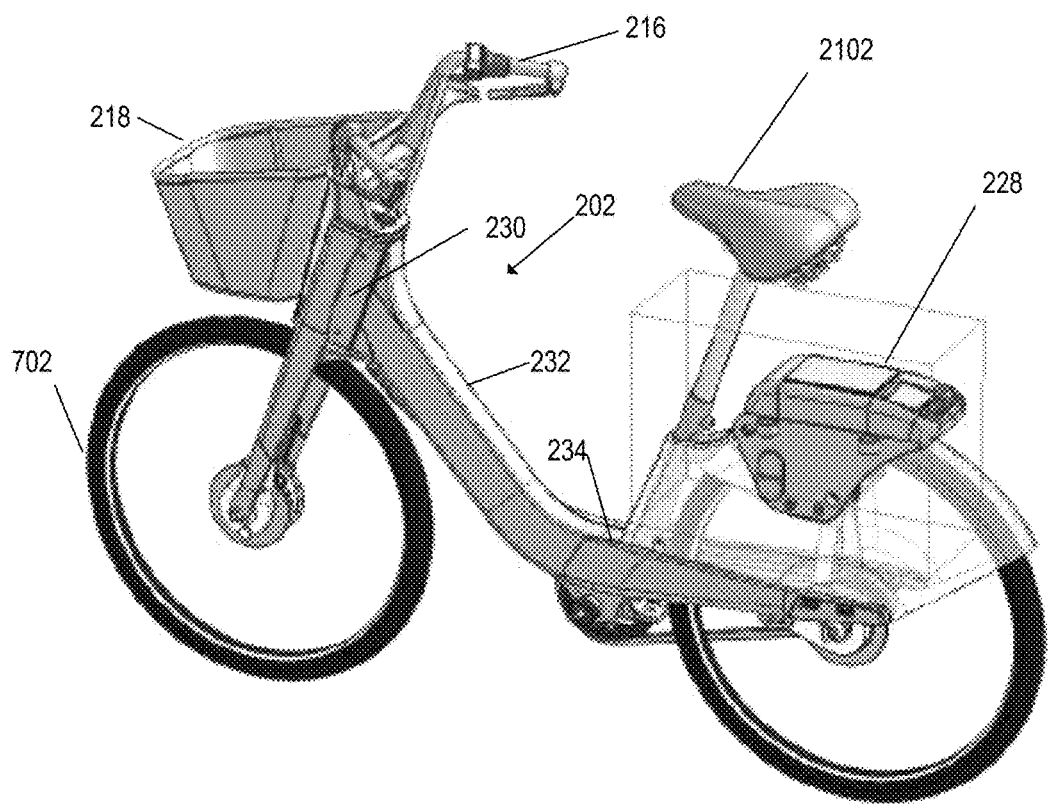
*FIG. 18*
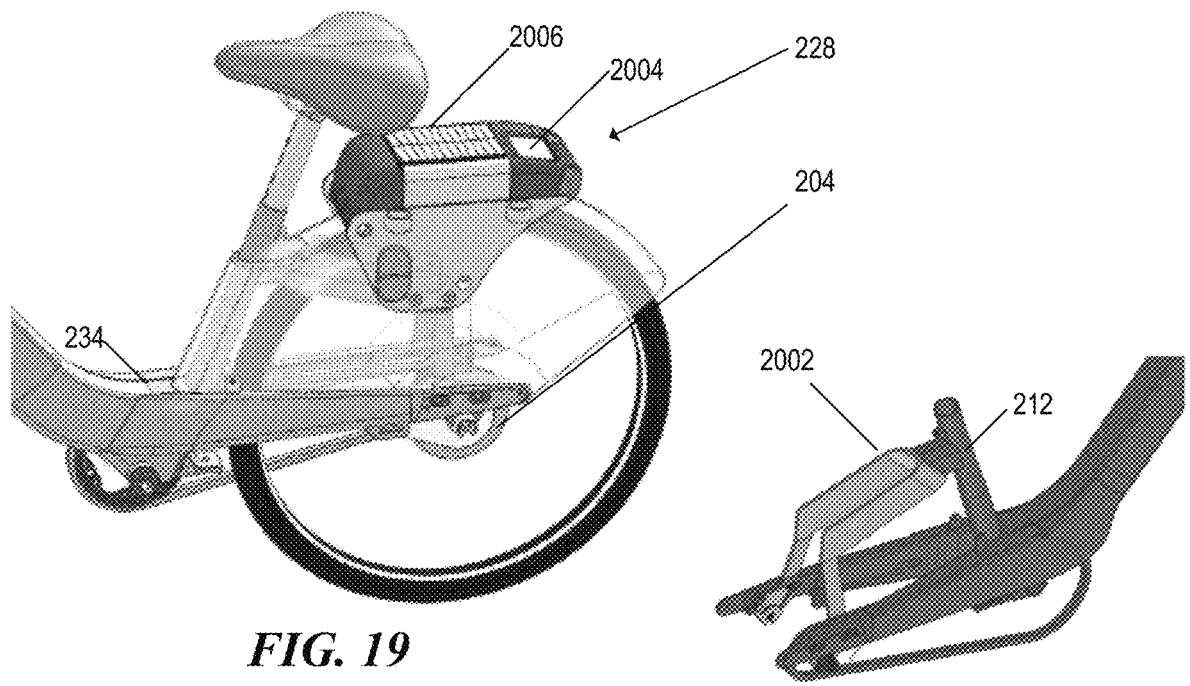
*FIG. 19*
*FIG. 20*

ELECTRIC ASSIST BICYCLE

CROSS-REFERENCE TO RELATED APPLICATIONS

This application is a non-provisional of and claims priority to U.S. Provisional Application No. 62/524,092, filed on Jun. 23, 2017, entitled "ELECTRIC ASSIST BICYCLE," which is hereby incorporated by reference in its entirety for all purposes.

TECHNICAL FIELD

The present disclosure relates to electric assist bicycles and more particularly to electric assist bicycles adapted for personal and private use.

BACKGROUND

A bicycle-sharing system, public bicycle system, or bike-share scheme, is a service in which bicycles are made available for shared use to individuals on a short-term basis. Bike share schemes allow people to borrow a bicycle from point "A" and return it to either point "A" or "B". Many bike-share systems offer subscriptions that make the first 30-45 minutes of use either free or very inexpensive, encouraging use as transportation. This allows each bicycle to serve several users per day. For many systems, smartphone mapping applications show nearby stations with available bicycles and open docks.

Bicycle-sharing systems can be divided into two general categories: "Community Bike programs" organized mostly by local community groups or non-profit organizations; or "Commercial Bikeshare programs" implemented by for-profit companies, sometimes in partnership with public agencies. The central concept of these systems is to provide free or affordable access to bicycles for short-distance trips as an alternative to motorized public transport or private vehicles, thereby reducing traffic congestion, noise, and air pollution. Bicycle-sharing systems have also been cited as a way to solve the "last mile" problem and connect users to public transit networks.

Bicycle-sharing systems have traditionally been used in dense, congested urban areas for short travel distances rather than for cross-town transportation or for use in sprawling urban areas or suburbs due to the construction of the bicycles. Bicycles used in sharing programs typically have few gears and are easily adjustable for different rider sizes. Also, the bicycles are typically built with a sturdy construction to withstand heavy and abusive use as well as to deter vandalism. As such, bicycles for sharing systems are often not ideal for longer riding distances such as across town, through sprawling urban areas or from a suburb to a city center.

An electric bicycle or an electric assist bicycle is a bicycle with an integrated electric motor which can be used for propulsion. The legal definition of what constitutes such vehicles (hereafter referred to as "electric assist bicycles" or "EABs") varies between jurisdictions. However, regulations typically require that an electric assist bicycle be operable using pedal power alone and that its electric propulsion components have restricted power and speed capabilities (for example: maximum motor power limited to less than 500 watts and/or maximum speed limited to less than 20 MPH). Electric assist bicycle usage is often encouraged by granting them the same legal status as conventional, non-assisted pedal-bicycles, thereby eliminating many of the regulatory requirements and operating expenses faced by owners of less environmentally friendly vehicles.

Electric assist bicycles have not traditionally been considered for public bicycle sharing programs because of the complexity of the added equipment and multitude of cable runs, making the shared electric bicycle more prone to maintenance problems and more susceptible to vandalism.

An electric assist bicycle in a bicycle sharing program that overcomes the previous disadvantages would allow a broader spectrum of users to participate in bicycle-share programs and would also provide users the opportunity to ride longer distances and geographically expand a bicycle-sharing program. A robustly designed electric assist bicycle that prevents maintenance problems and is not susceptible to damage is also desirable for personal use with electric assist bicycles. Overall, the need exists for a bicycle that overcomes the above problems, as well as one that provides additional benefits. The examples herein of some prior or related systems and any associated limitations are intended to be illustrative and not exclusive. Other limitations of existing or prior systems will become apparent to those of skill in the art upon reading the following Detailed Description.

BRIEF DESCRIPTION OF THE DRAWINGS

FIGS. 18 and 19 are isometric views of an electronic locking and control assembly.

FIG. 20 is an isometric view of mounting equipment for an electronic locking and control assembly.

Figure 1:
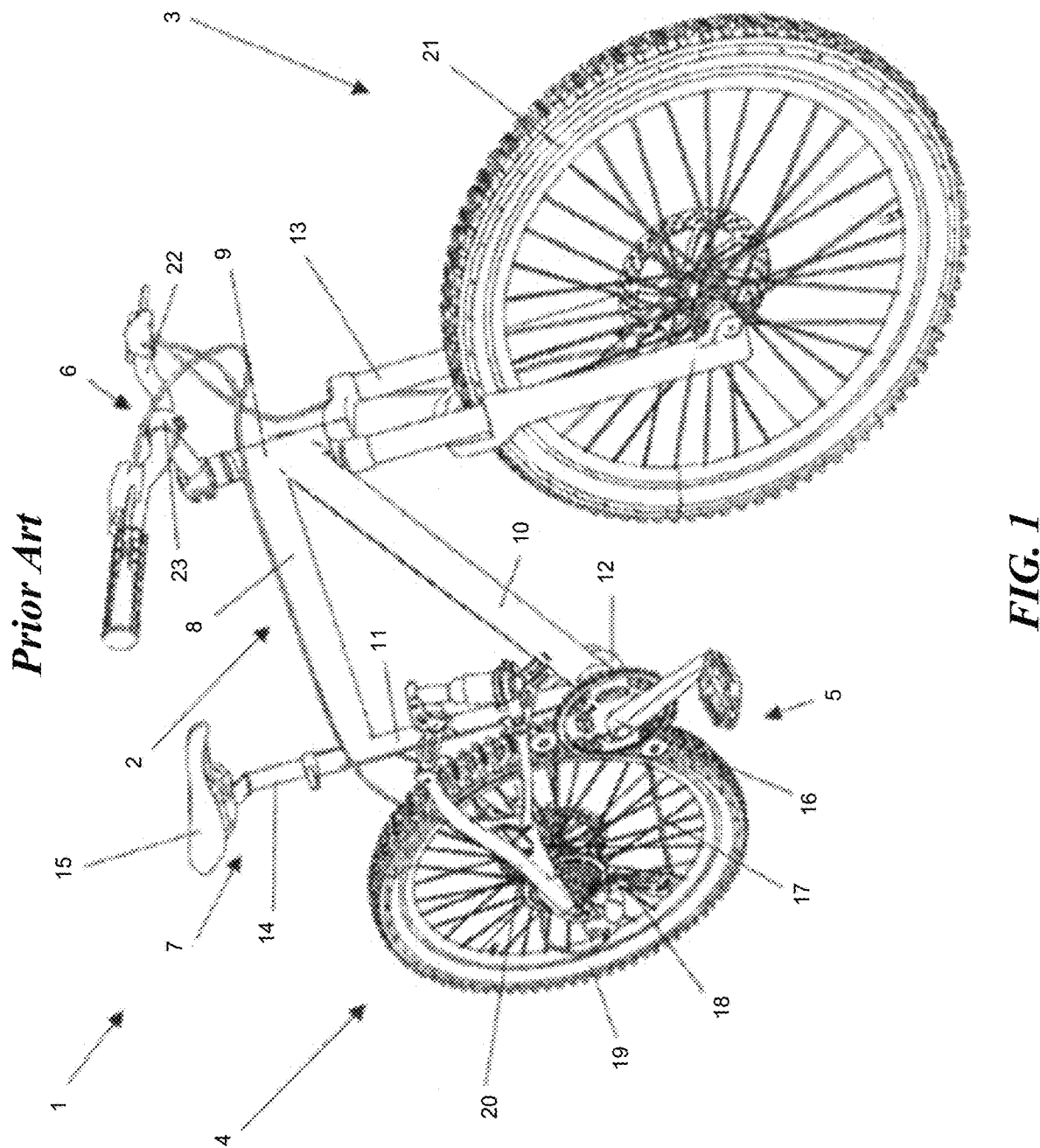
FIG. 1 illustrates the various features of a prior art bicycle.

In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 302 is first introduced and discussed with respect to FIG. 3). Sizes of depicted elements are not necessarily drawn to scale and these various elements may be enlarged to improve legibility.

DETAILED DESCRIPTION

Example implementations and embodiments of the present technology are directed to an electric assist bicycle, or e-bike that is suitable for personal use or public use, such as in a public bicycle sharing program. Advantages of the present technology include one or more of the following features:

- A sturdy, sleek, step-through frame that supports an adjustable, extended range seat and seat post;
- A hollow frame construction that allows for control and electric cables to be run through the interior of the frame to prevent exposure and vandalism to the cables;
- An easily accessible battery compartment housed in the main tube of the frame, sized to include the rechargeable battery and electric controls and/or control circuitry for the electric assist motor, where the battery compartment is front loading and accessed through the head tube or steering post to provide ease of maintenance;
- A front basket configured to allow access to the front-loading battery compartment;
- A chain guard integrated with the bicycle frame to provide protection to the chain or belt without adding additional parts or a weak component susceptible to damage or vandalism;
- A multi-speed belt drive for durability;
- A dynamo-generator and/or solar power generator to recharge the battery; and
- Electronics including a modular locking system and electronic control panel including RFID/NFC communications, GPS integration and wireless connectivity, having control circuitry for monitoring battery level and performance, location, and providing information to the user via a touch screen display, where the module locking system is easily interchangeable from the bicycle but securely attached to the bicycle, and where the modular locking system facilitates locking or securing the bike to any bike rack or to a custom bicycle ride sharing station.

Various examples of an electric assist bicycle will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used herein is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

In some implementations, an electric assist bicycle includes a hollow frame and one or more cables routed within the hollow frame. Routing cables through the frame inhibits damage and vandalism to the cables. The cables can be cables used for braking or shifting gears or for connecting components such as a rechargeable battery to an electric drivetrain, lights, or other components. The electric assist bicycle can also include a front fork, a front wheel, and a front wheel hub within the front wheel. The cables can be routed through a slot in the front fork and terminate at the front wheel hub. The cables routed through the slot can be covered by a cable shield that is between the front fork and the front wheel hub. The electric assist bicycle can further include a rear fork (also having a slot) and a rear wheel hub within the rear wheel. Any cables routed through the rear fork can be covered by a cable shield between the rear fork and the rear wheel hub.

The hollow frame can include a head tube, main tube and a chain stay. The cables can extend though the head tube, main tube, chain stay and terminate at the rear wheel hub. Such an arrangement helps inhibit damage and vandalism, among other benefits.

The electric assist bicycle can include handlebars comprising a brake lever. In some implementations, one of the cables routed through the hollow frame is a brake cable that is connected to the brake lever. Routing the brake cable through the handlebars helps prevent damage and vandalism to the brake cable. The brake lever can be pivotably coupled to a free end of the handlebars. In some implementations, the brake cable can be routed internally through the handlebars, through the front fork and terminate at the front wheel hub. Again, such an arrangement helps inhibit damage and vandalism, among other benefits.

The hollow frame of the electric assist bicycle can include a head tube. A rechargeable battery can pass through the head tube to an internal battery compartment positioned within the hollow frame. The rechargeable battery can be accessed through an access panel connected to the head tube. The front fork can be connected to the head tube, and the rechargeable battery can pass through an aperture in the front fork. The hollow frame can include a chain stay and the drivetrain can be routed through the chain stay. Such an arrangement allows for easy replacement of batteries, while providing secure and unobtrusive location of batteries and other benefits.

The electric assist bicycle can include a seat, a seat tube, a seat post received into the seat tube that extends through an aperture in the seat tube and is adapted to adjust a height of the seat, and a bottom bracket. The lower end of the seat post can be positionable below the bottom bracket. Such an arrangement helps provide a long adjustment range for a walkthrough frame, among other benefits.

The electric assist bicycle can include electric assist components. Electric assist components can include a rechargeable battery, motor, and an electric drivetrain. The electric assist bicycle can further include an electronic locking and control system. The electronic locking and control system can include a location tracking system, solar power generator, and a touch screen interface. The cables can connect the rechargeable battery to the electronic locking and control system internally, preventing damage to the cables. The electric drivetrain can be covered in part by the hollow chain stay to prevent or inhibit damage to the drivetrain. Such an arrangement provides robust functionality, among other benefits.

Overall, an electric assist bicycle will now be described that includes handlebars, an endcap or base coupled to an end of one of the handlebars and a brake lever pivotally coupled to the base. The base can include a cable routed internally through the handlebars and connected to an end of the brake lever. The brake lever can be aligned with an end of the handlebars. A cable can be routed through a slot in the front fork and terminate at the front wheel hub. The electric assist bicycle can include a hollow frame that includes a head tube and a main tube, a rear fork, and a rear wheel hub. The cable can be routed through the head tube and the main tube to the rear fork to connect to the rear wheel hub. The electric assist bicycle can include a shifter, and a shroud. The shifter can be coupled to cables that extend from the shifter to a frame. The shroud covers the cables as the cables transition from the shifter to the frame. A free end of the brake lever is partially covered by the shroud to prevent the brake lever from catching on objects.

The electric assist bicycle includes a rechargeable battery received into an internal battery compartment in the hollow frame. The hollow frame can include a head tube and a main tube and the rechargeable battery can be received through the head tube into the main tube. The electric assist bicycle can include a basket having an access panel. The rechargeable battery can be accessed through the access panel and the access panel can be removably connected to the head tube. The rechargeable battery can pass through an aperture in a front fork of the electric assist bicycle. The electric assist bicycle can include an electrical locking and control system and one or more cables can extend internally through the hollow frame from the rechargeable battery to the electrical locking and control system.

In some implementations, a bicycle frame can include a hollow frame having a hollow main tube connected to a hollow chain stay. The hollow main tube can be connectable to a hollow head tube. The head tube can be connectable to handlebars and to a front fork. The hollow chain stay can be configured to receive a rear wheel, and a continuous passage can be defined from an opening from the head tube to an opening in the chain stay proximate to a rear wheel. One or more cables can be routable within the hollow frame through the continuous passage.

A head tube assembly for a front fork and steering column of a bicycle is disclosed. The bicycle can include a hollow frame. The head tube assembly can include a head tube configured to receive the front fork and steering column of the bicycle and a hollow headset compression nut that couples, via threads, with the head tube. The internal cable run can be provided through the head tube, the hollow headset compression nut and the front fork. The internal cable run can include a center steering axis that extends through pivot points of the front fork, thereby providing secure cable routing for cables originating outside of the steering column and ending at a non-pivoting side of the hollow frame. In some implementations, the head tube assembly can further include upper and lower sets of bearings received between the head tube and the front fork. The front fork can include upper and lower plates. The hollow headset compression nut can mate with the upper plate of the front fork and a matching upper plate of the head tube to provide a compression force between the upper plate of the front fork and the matching upper plate and the upper bearings therebetween, and between the lower plate of the front fork and a lower portion of the head tube and the lower bearings therebetween.

The front fork can include left and right forks terminating in dropouts that are configured to receive a front wheel. The internal cable run can extend from handlebars and into the hollow frame and into the left or right fork to the dropouts. The hollow headset compression nut can have a hollow, cylindrical shape and can have threads along an upper, outer portion, thereby acting as a threaded race for the head tube assembly.

To achieve the above-mentioned advantages and incorporate the many desirable features needed to achieve an electric assist bicycle suitable for personal and public use, embodiments of the present technology must vary from traditional bicycle forms. By way of familiarization, FIG. 1, illustrates a common bicycle style wherein bicycle 1 is comprised of triangular frame 2, front wheel assembly 3, rear wheel assembly 4, pedal propulsion drive assembly 5, control assembly 6 and seating assembly 7. Triangular frame 2 is comprised of top-tube 8 welded to head-tube 9 welded to down-tube 10 welded to seat-tube 11. Head-tube 9 acts as a bearing for steering the bicycle's front fork 13, which may include an optional telescopic suspension as illustrated. The axis of head-tube 9 is inclined from the vertical at a head tube angle that imparts steering stability to the moving bicycle. The joint between down-tube 10 and seat-tube 11 includes a transverse "bottom-bracket" tube 12 which houses a bearing for rotatable pedal-crank 16. Chain drive 17 transfers crank rotation to derailleur/freewheel mechanism 18, which varies the drive ratio applied to turn wheel 19. Rear fork 20 joins the driven wheel assembly to frame 2 and may include the optional suspension means as illustrated. Front wheel and brake assembly 21 is steered and controlled by handlebar 22 affixed to front fork 13 through handlebar stem 23 (the handlebar stem having integral clamping, means for gripping onto both bar and fork). The rider sits on seat 15, which is mounted to frame 2 via seat post 14, which in turn is clamped telescopically within seat-tube 11.

Bicycle 1 of FIG. 1 does not provide a robust bicycle design for personal or public use. For example, bicycle 1 exposes operating cables that run along the exterior of the frame components, includes multiple working and moving parts that are easily damaged or vandalized, and a frame that does not easily accommodate multiple rider sizes.

Figure 2:
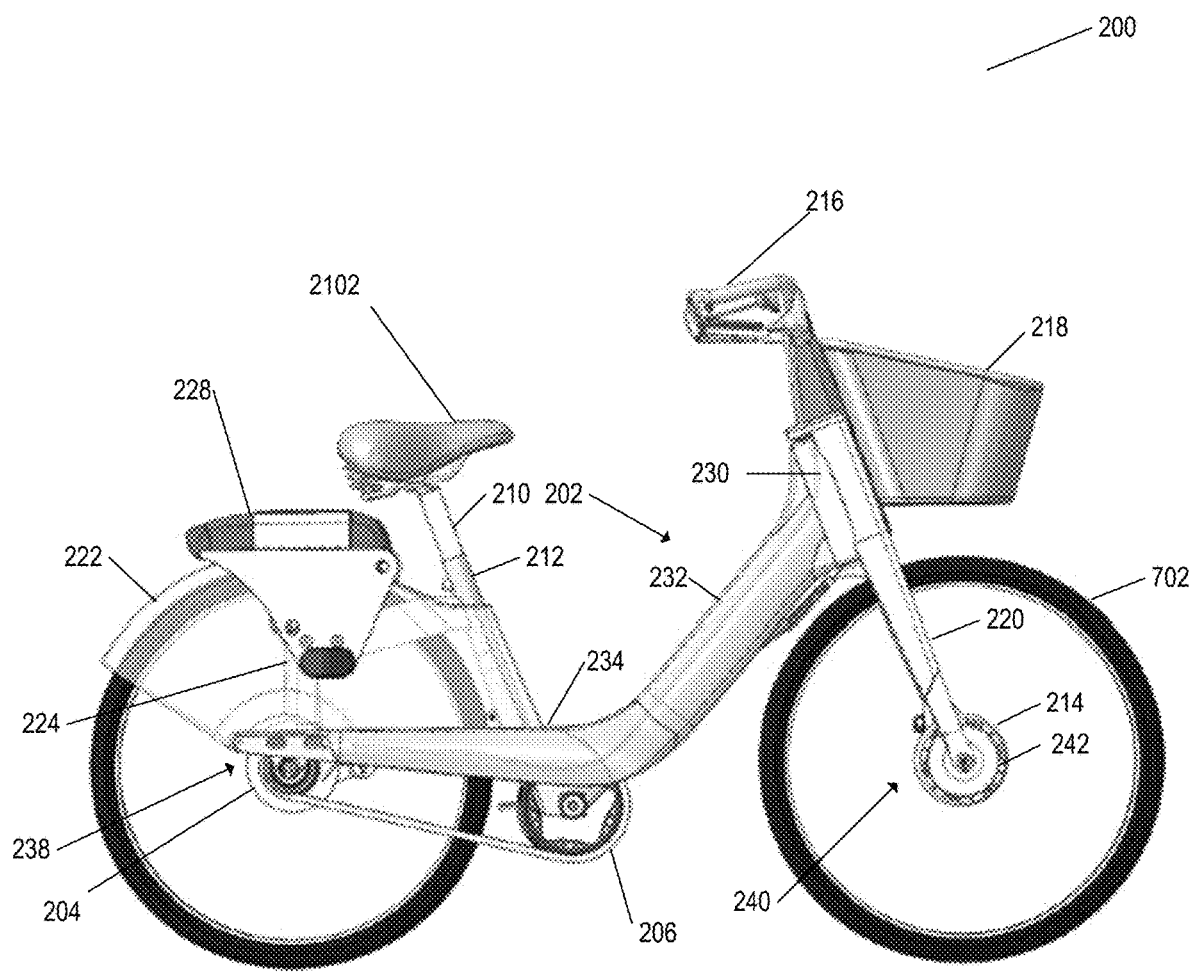
FIG. 2 is a side view of an electric assist bicycle.
Figure 3:
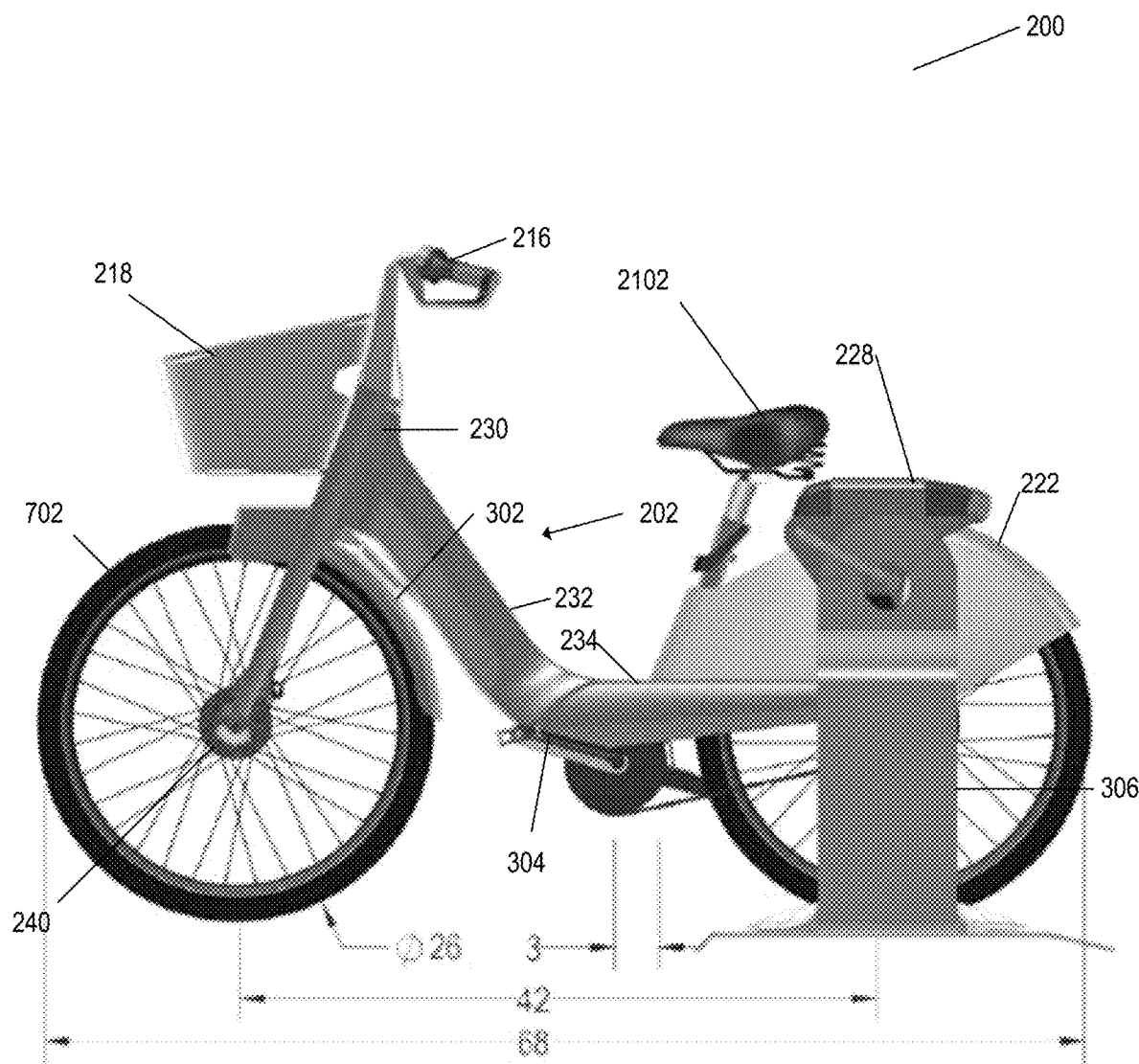
FIG. 3 is a side view of an electric assist bicycle, including a locking bicycle stand.

FIGS. 2 and 3 illustrate a bicycle 200 having example features for a robust bicycle. Some features are specifically tailored to an electric assist bicycle whereas other features can be integrated into a common bicycle. In some implementations, bicycle 200 is an electric assist bicycle having an electric assist motor (e.g., front motor 242, rear motor (not shown)) powered by a battery pack such as a 500 watt hour battery pack, a 1536 watt hour battery pack, or other watt hour, depending on how much space is available and how much power is needed. The electric pedal assist may provide an empowering boost to each bike share trip making climbing hills and extending the range of a trip easy and enjoyable. Some embodiments of the electric assist bicycles have a long range (e.g., 30-80 or more mile range) between charges, allowing for multiple cross-town trips per bike.

Bicycle 200 can include a hollow frame 202, rear wheel 238, rear wheel hub 204, a belt drive and electric pedal assist drivetrain 206 using, for example, a 350 W electric motor (in one or both hubs), an integrated battery pack(s) positioned inside hollow frame 202 in communication with a dynamo generator (not shown) and solar panels 2006 (shown in FIG. 20), hub front and rear brakes, puncture resistant tires, an LED front and/or rear light, front and/or rear reflectors, seat post 210, seat tube 212, front wheel hub 214, front wheel 240, handlebars 216, basket 218, front fork 220, skirt guard 222, rear fork, and electronic locking and control system 228. Seat post 210 can be an extended-range, adjustable quick release seat post with indexed sizing guides to assist riders, and security fasteners to inhibit vandalism. A solar power generator (not shown) can use solar panels to capture energy and the dynamo generator (not shown) can use energy collected from movement of the pedals to recharge rechargeable battery 402. Cables running internally to bicycle 200 can transfer the energy to rechargeable battery 402. Rechargeable battery 402 may be used to power motors such as front motor 242, lights, electronic locking and control system 228, and other components.

The hollow frame 202 can include head tube 230, main tube 232, and chain stay 234. A rechargeable battery (not shown) can fit in an internal battery compartment in hollow frame 202 in, for example, main tube 232.

FIG. 3 illustrates further features of bicycle 200. Bicycle 200 can include a front fender 302 and pedals 304 (e.g., made of aluminum, with rubber grips or platforms for gripping shoes, and reflective sidewalls for safety). Bicycle 200 can be locked into a locking bike stand/docking station 306 via electronic locking and control system 228.

Electronic locking and control system 228 can have a GPS tracking feature and wireless connectivity to a network. Electronic locking and control system 228 may further include an LCD keypad, an RFID/NFC reader, and an electro-mechanical lock and steel U-bar or flexible lock (e.g., made of braided wire). Electronic locking and control system 228 can be designed to lock to any public bike rack or to a specifically designed docking point such as docking station 306. The lock is easy to use and gives the user the flexibility to park the bike anywhere throughout the course of their trip.

Basket 218 can include information or ad display panel mounting. Bicycle 200 can include one or two full coverage skirt guards (e.g., skirt guard 222) or fenders (e.g., 302) covering the top portions of the front and rear tires. In one example embodiment, the bicycle of the present technology weighs approximately 65 pounds, is approximately 68 inches long, 23 inches wide and 44 inches high. The hollow frame can be an aluminum step through frame in one example. The hollow frame can be made of one or more other materials in addition to or instead of aluminum such as hi-tensile steel, chromoly steel, carbon fiber, or titanium. The rear wheel hub 204 can be internally or externally geared and can include any number of gears (e.g., 3-speed internally geared, 10 speed externally geared, etc.). In some embodiments, bicycle 200 can be a fixed gear bicycle.

Figure 4:
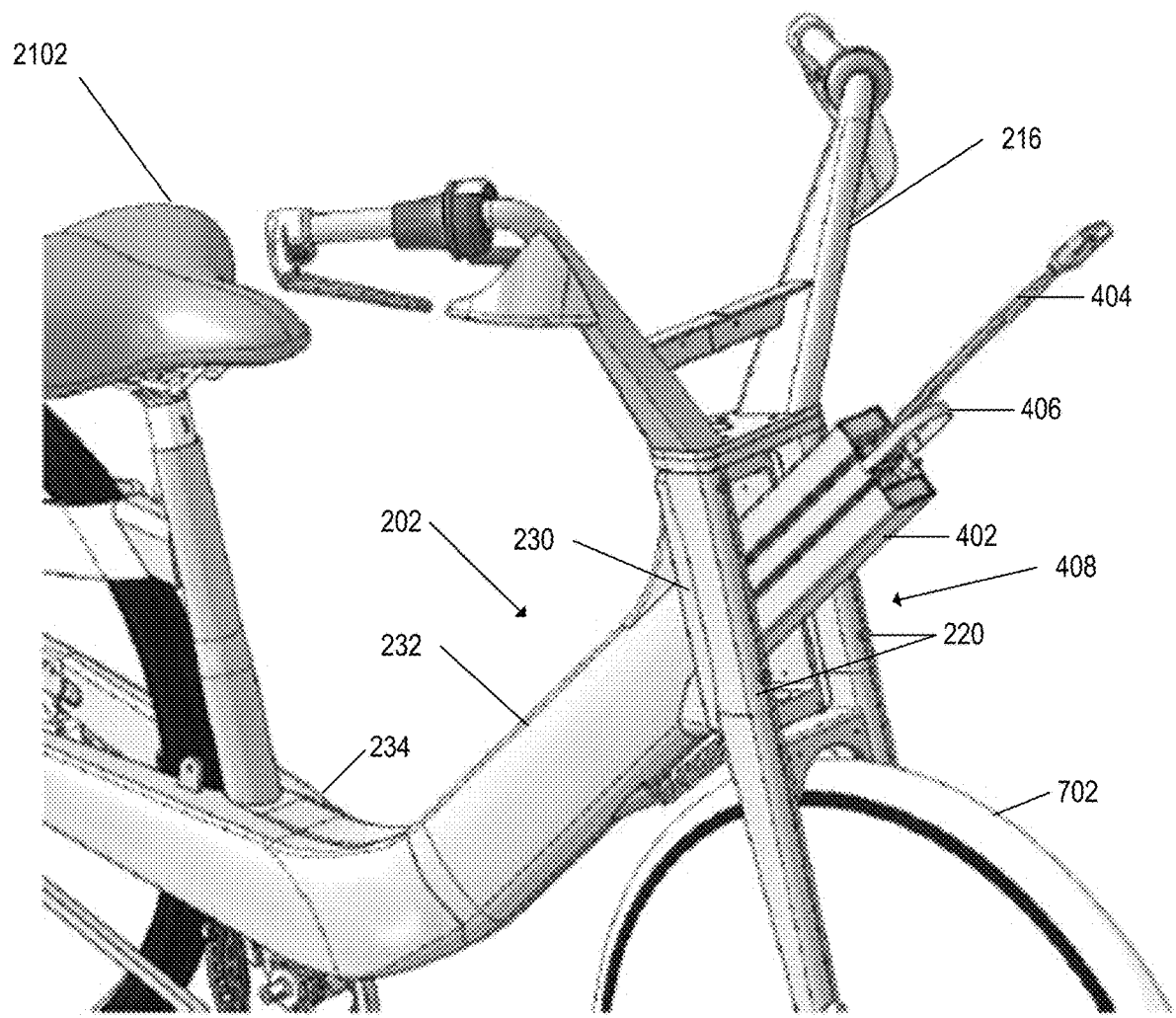
FIG. 4 is an isometric view of an internal battery compartment integral with the frame.
Figure 5:
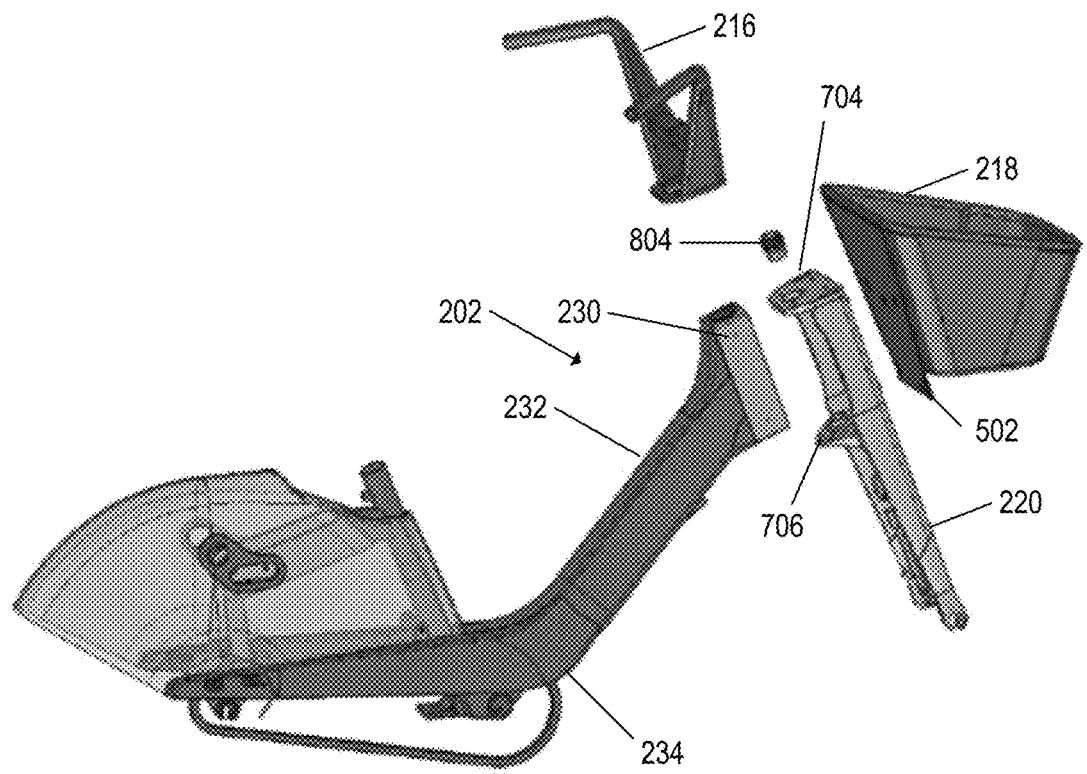
FIG. 5 is an exploded view of an electric assist bicycle including a frame, front fork, and basket including an access panel to an internal battery compartment.

FIG. 4 illustrates an internal battery compartment integral with the frame of an electric assist bicycle. The internal battery compartment can house a rechargeable battery 402. Rechargeable battery 402 can provide power via cables to various components of the bicycle such as electronic locking and control system 228 and front motor 242. Motors, such as front motor 242 and a rear motor (not shown in FIG. 4) can be powered by rechargeable battery 402 to turn front wheel 240 or rear wheel 238. Pedals 304 turn as a rear tire 702 moves. A remote system can monitor location, rechargeable battery 402 power levels and health, speed, and other data. The head tube 230 and front fork 220 pivot points are hollow with respect to the fore-aft axis of the bicycle, allowing for a rechargeable battery 402 for drivetrain 206 and the control electronics to be accessed via the front of the bicycle frame. Rechargeable battery 402 can fit through steering column 408, including through an aperture in the front fork 220 and be received into head tube 230 to main tube 232. Rechargeable battery 402 can be removably positioned in main tube 232. In some implementations, rechargeable battery 402 can be connected to other components via rechargeable battery cable 404 and can be pulled from main tube 232 and head tube 230 via handle 406. A securely mounted door mechanism such as access panel 502 can securely cover the access during normal use of the bicycle, as shown in FIG. 5. Access panel 502 can be a flat plat extending from at least an upper edge of front fork 220 to a lower edge of front fork 220 and can be coupled with basket 218. One value of this arrangement is that the electronics of the bicycle are extremely well concealed from both vandalism and accidental wear, while negating the requirement for costly seals and connection mechanisms of a more exposed solution.

Figure 6:
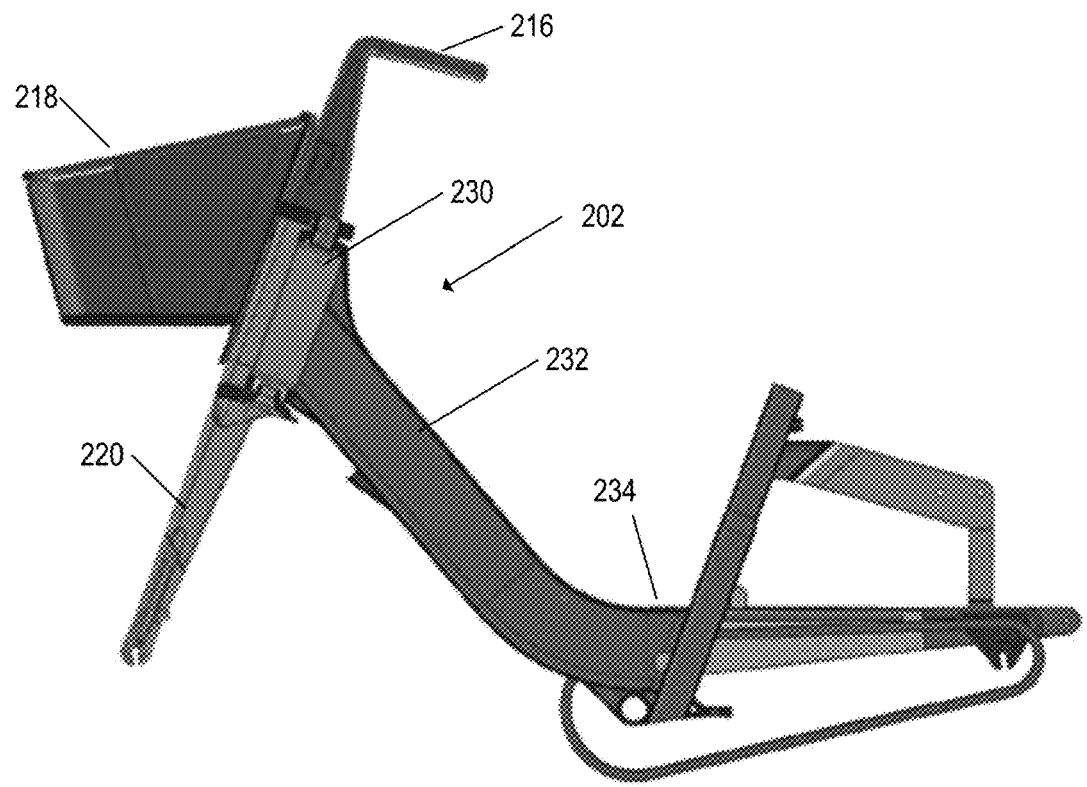
FIG. 6 is a side view of an electric assist bicycle including a frame, front fork, and basket including an access panel to an internal battery compartment.

FIGS. 5 and 6 illustrate an exploded view and a side view, respectively, of an electric assist bicycle including a frame 202, front fork 220, and basket 218 including an access panel 502 to an internal battery compartment. As shown in FIG. 5, a rechargeable battery such as rechargeable battery 402 and/or other electronics can pass through an aperture in front fork 220 to be received into head tube 230 and then into the main tube 232. Rechargeable battery 402 and other electronics can reside in an internal battery compartment inside hollow frame 202 (e.g., head tube 230, main tube 232). Basket 218 can include removable access panel 502 positioned adjacent to front fork 220 and head tube 230 to provide access to the internal battery compartment.

Figure 7:
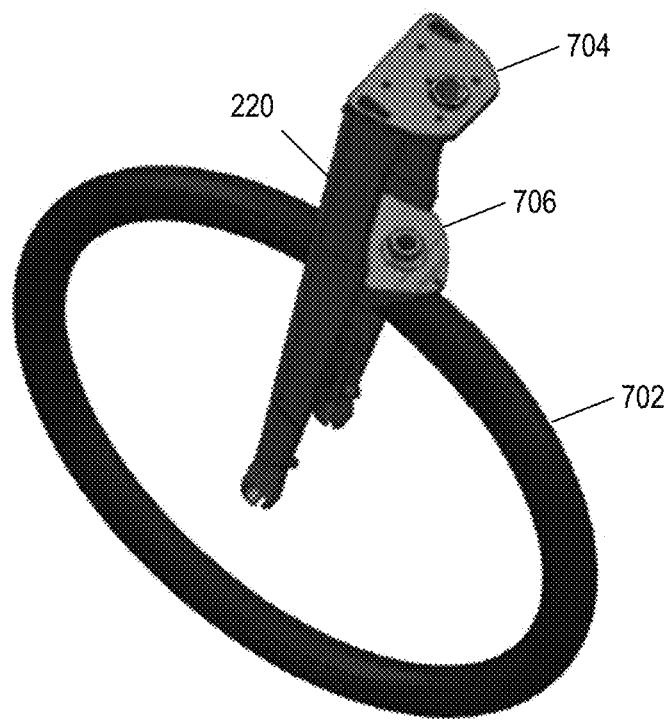
FIG. 7 is an isometric view of a front fork assembly providing internal cable passages.
Figure 8:
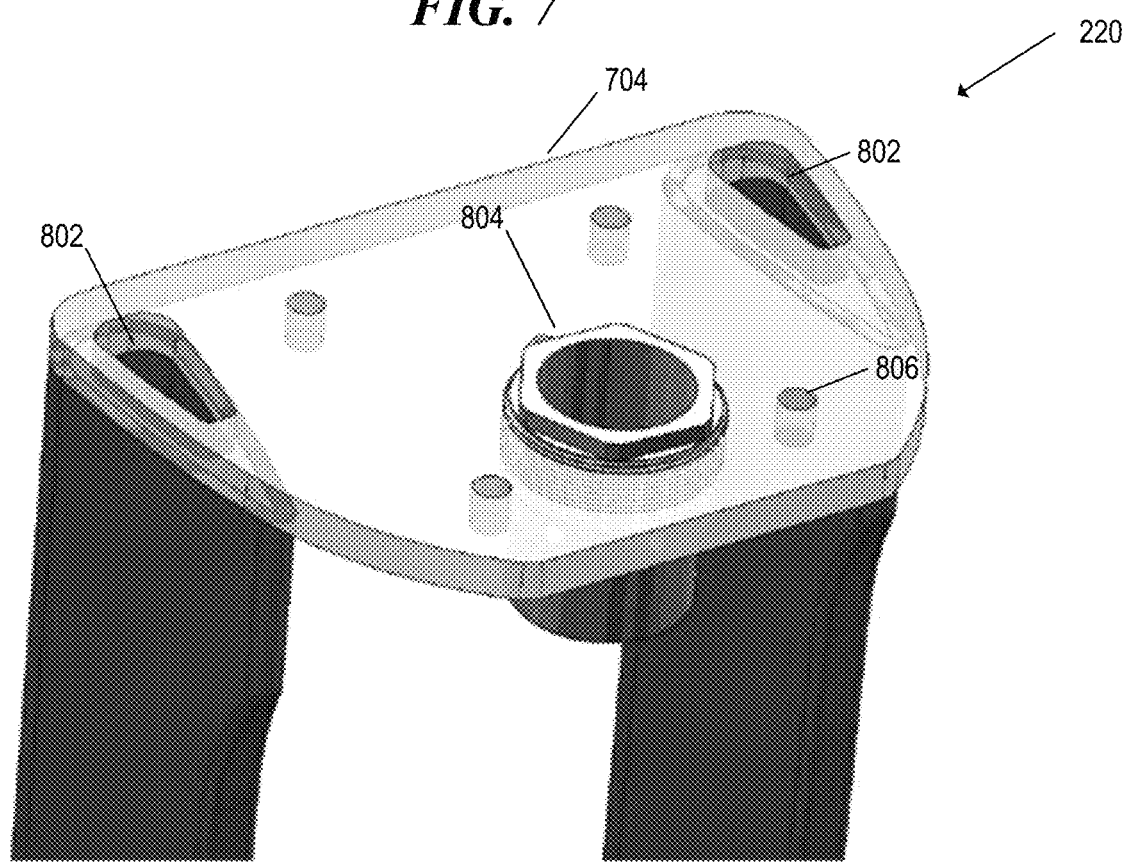
FIG. 8 is an isometric view of a front fork assembly providing internal cable passages.

FIGS. 7 and 8 illustrate an example of front fork 220. Front fork 220 can be connected to front tire 702 via a front wheel (not shown). Front fork 220 can be rotatably connected to head tube 230 (not shown). Head tube 230 can fit between the space between upper plate 704 and lower plate 706 to prevent relative vertical movement between front fork 220 and head tube 230 such that the front wheel 240 can be rotated via the handlebars 216 relative to hollow frame 202 to steer the bicycle. Rechargeable battery 402 and other electronics can pass through the space between upper plate 704 and lower plate 706 to be received into head tube 230. Front fork 220 includes access to the internal battery compartment. Front fork 220 can further include hollow fork tubes 802 and a hollow headset compression nut 804 to facilitate internal cable runs. For example, cables can be routed from handlebars 216 through hollow fork tubes 802 and through slot 1204 shown in FIG. 12A to front wheel hub 214. Cables can also be routed from or through handlebars 216 through hollow headset compression nut 804 through head tube 230, main tube 232, and chain stay 234 to terminate at rear wheel hub 204. Handlebars 216 can be connected to upper plate 704 with fasteners 806 such that the rotation of the handlebars causes front fork 220 to rotate relative to the bicycle's frame 202.

Figure 9:
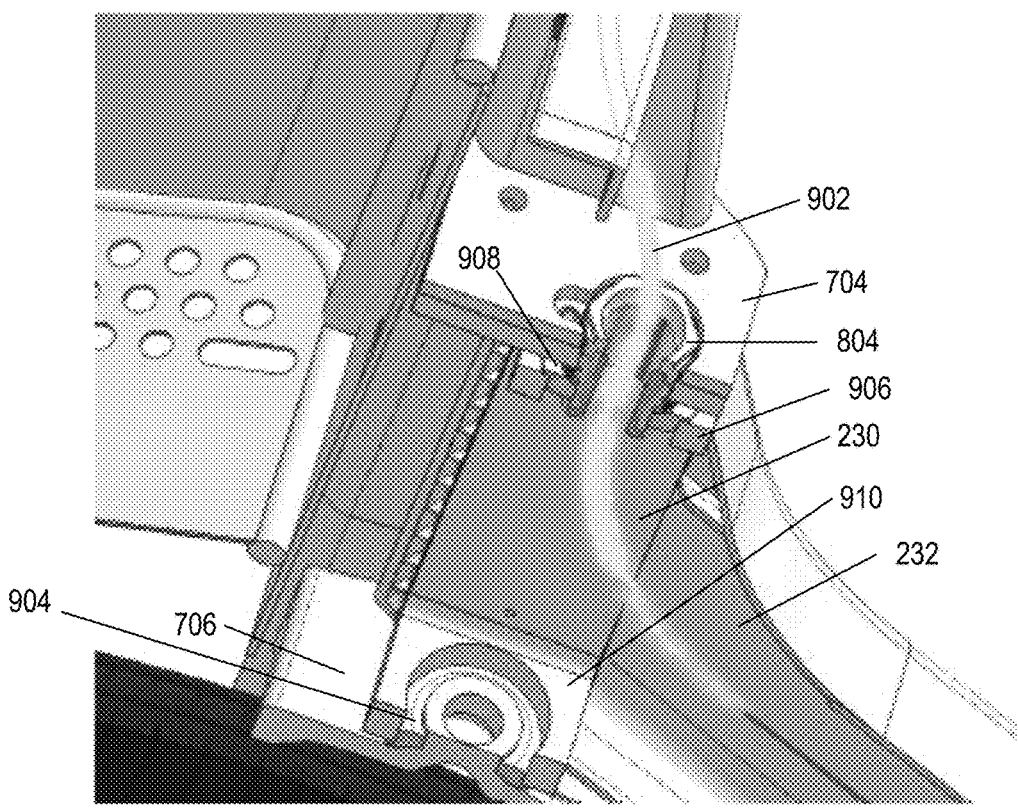
FIG. 9 is a cross-section of a head tube assembly providing internal cable passages.
Figure 10:
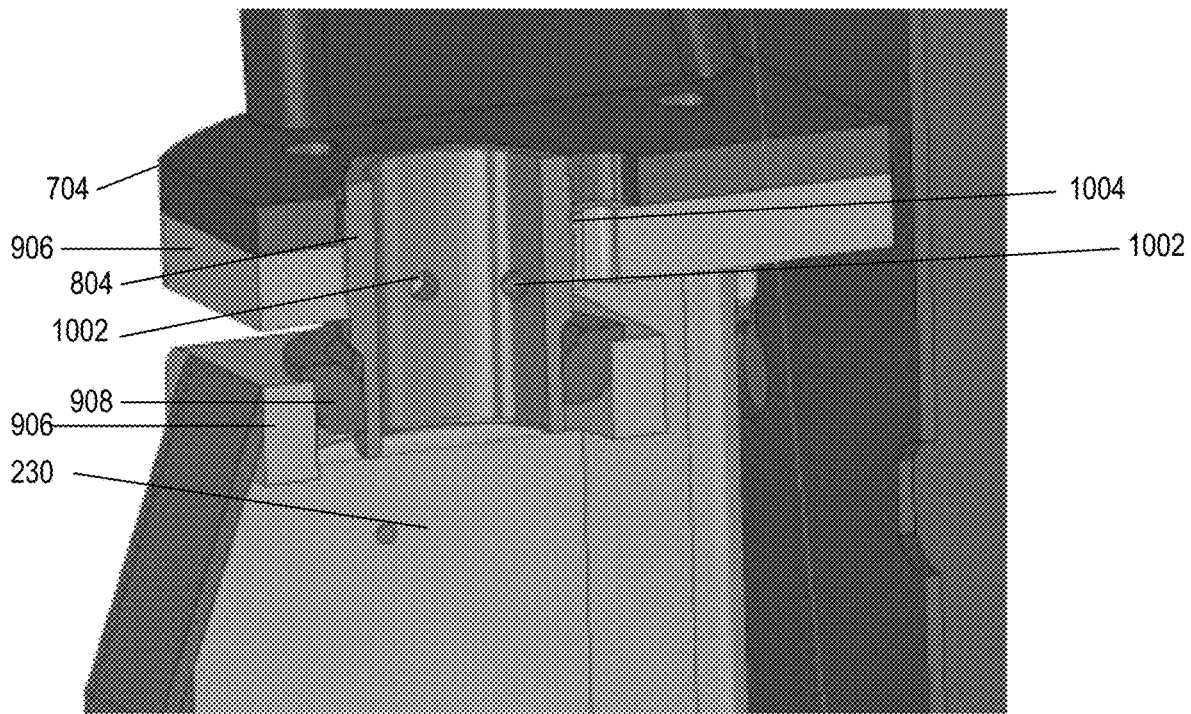
FIG. 10 is a cross-section of a head tube assembly providing internal cable passages.

FIGS. 9 and 10 are cut-way isometric views of a head tube assembly providing an internal cable run. Cable 902 extends from handlebars 216 (e.g., internally through the handlebars 216), through the hollow headset compression nut 804 and head tube 230 and into the internal battery compartment into the main tube 232. The internal cable run includes a center steering axis that extends through pivot points of front fork 220, providing easy and secure cable routing for cables 902 originating outside of the steering column and ending at the non-pivoting side of hollow frame 202.

Hollow headset compression nut 804 can have a hollow, cylindrical shape and can include threads 1004 along an upper, outer portion, thereby acting as a threaded race for the head tube 230 assembly. Hollow headset compression nut 804 can be coupled via threads 1004 to upper plate 906 of head tube 230 and upper plate 704 of front fork 220. The head tube 230 assembly can include free bearings (not shown) between upper bearings seat or cup 908 and an outwardly extending shoulder of the compression nut 804. A lower bearings seat or cup 904 likewise receives bearings (not shown). As shown, hollow headset compression nut 804 can mate with the upper plate 704 of front fork 220 and matching upper plate 906 of head tube 230 to provide a compression force between upper plate 704 of front fork 220 and matching upper plate 906 of head tube 230 and upper bearings therebetween and between lower plate 706 of front fork 220 and a lower portion 910 of head tube 230. Thus, head tube 230 assembly provides a preloading mechanism that allows the central steering axis to be clear for passage of cables, such as cable 902.

Adjustment holes 1002 allow steering column 408 to be adjusted with a wrench by changing the preload by tightening or loosening threads 1004. Such a configuration provides an adjustable yet tamper resistant head tube 230 assembly.

Figure 11:
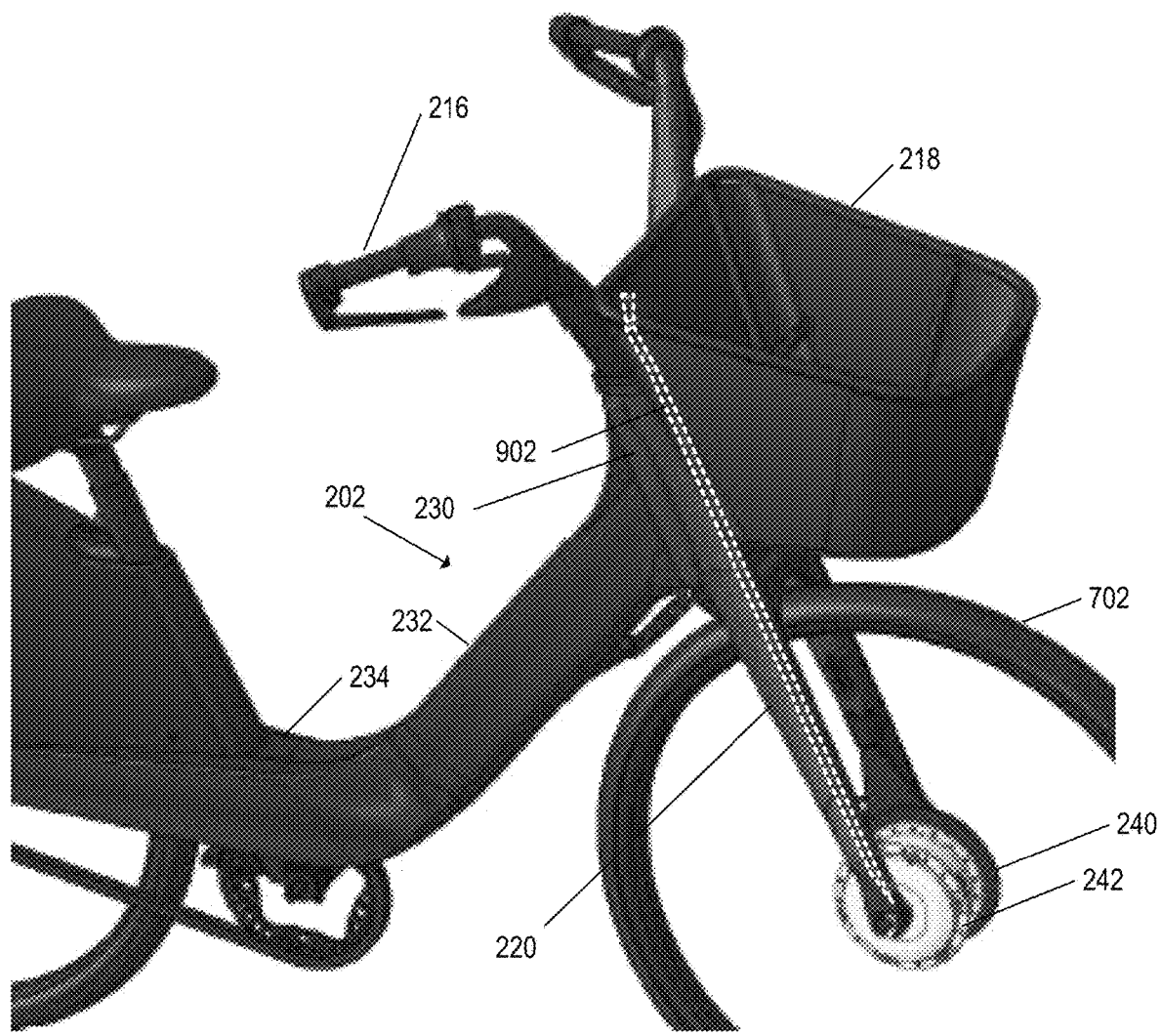
FIG. 11 is an isometric view of a front fork and head tube assembly providing internal cable passages.

FIG. 11 illustrates an example of a concealed cable path. As shown in FIG. 11, the construction of front fork 220 provides a path of cable 902 (shown in broken lines) from front motor 242 (in the front wheel hub) through the front fork 220 and head tube 230 into handlebars 216. Cable 902 can be made of Teflon, stainless steel, or other materials. Cable 902 can run from shifter 1602 or from brake lever 1502 where the user can apply the brakes or change gears.

Figure 12A:
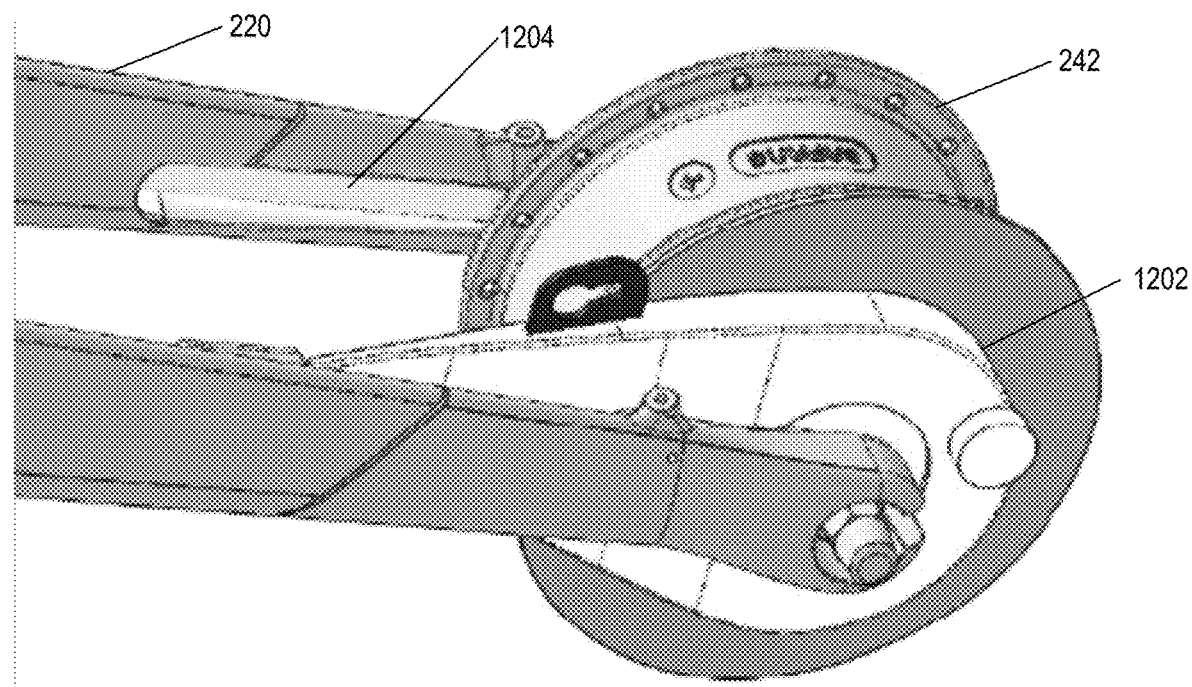
FIGS. 12A, 12B, and 12C are views of a front fork assembly providing internal cable passages.
Figure 12B:
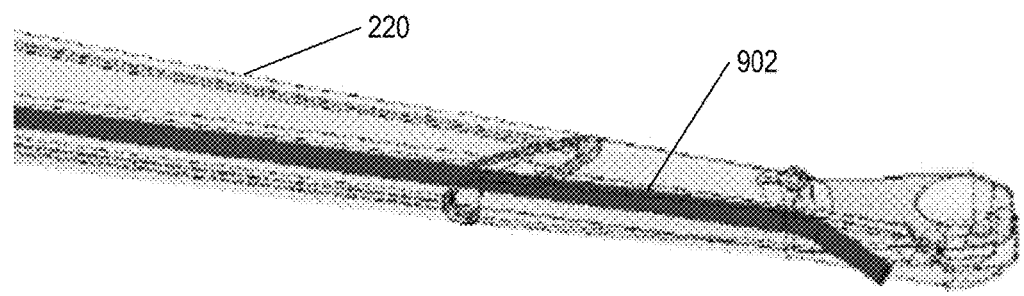
Figure 12C:
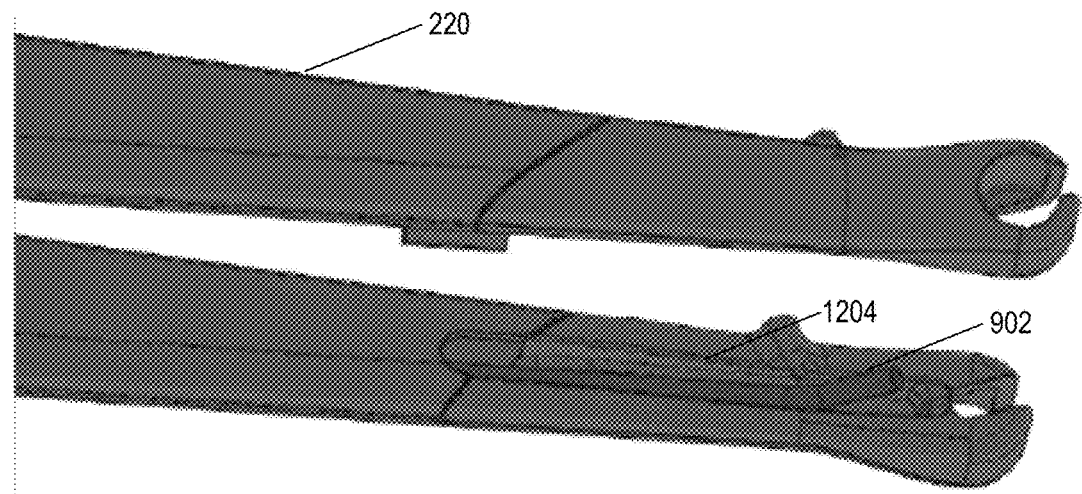
Figure 13:
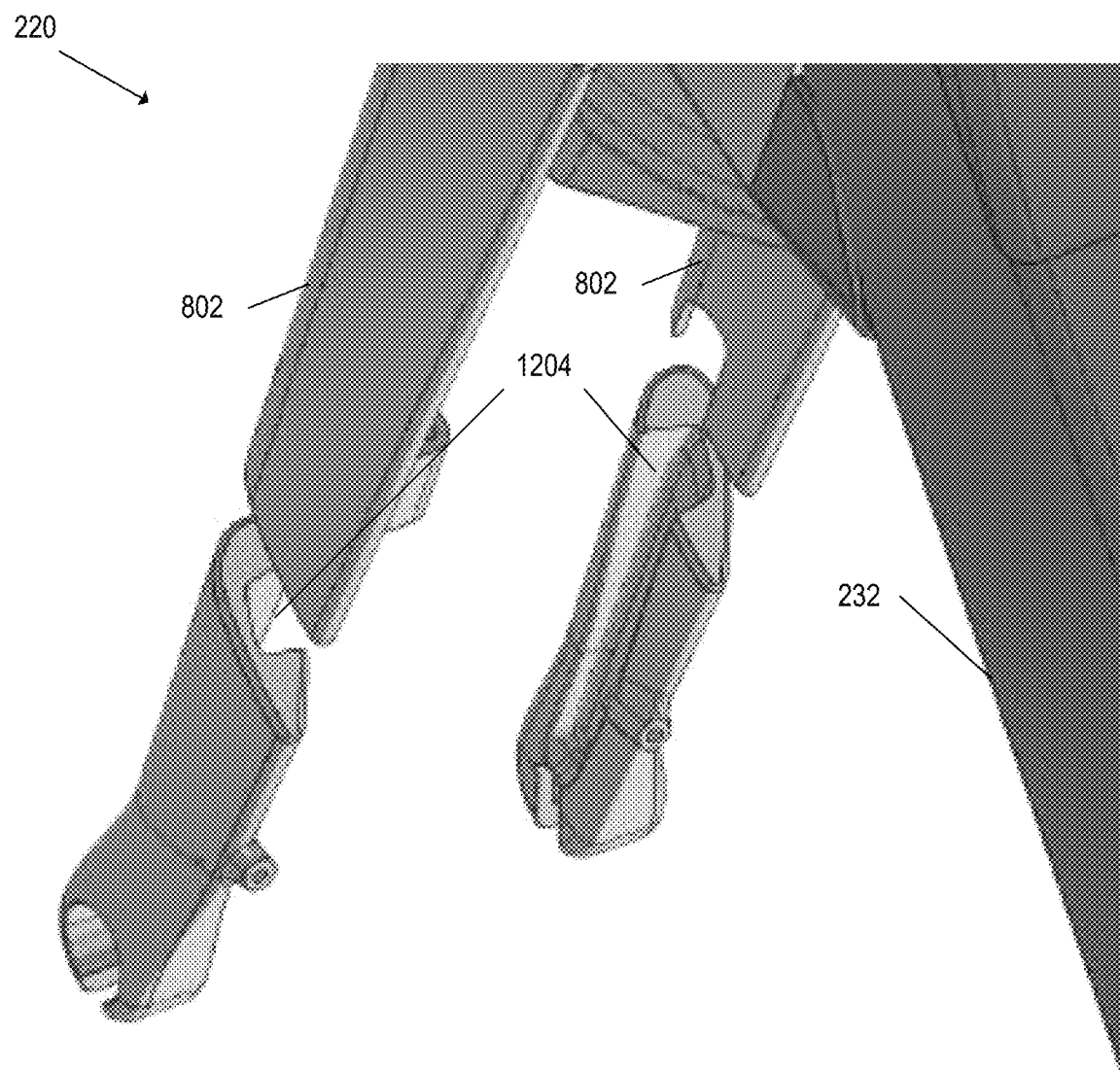
FIG. 13 is an isometric view of a front fork assembly providing internal cable passages.

FIGS. 12A, 12B, and 12C provide additional views of the internal cable path through the front fork. As depicted in FIG. 12A, cable shield 1202 can provide additional covering and shielding to protect cables as they emerge from slots 1204 in front fork 220 and connect with the front motor 242. A slot 1204 along the length of the inside of the dropout provides a concealed path for the cable from the hub to the inside of the hollow fork tube 802. This gives secure access to the cable throughout the rest of the frame, without leaving it exposed. In one example embodiment, when front motor 242 and front wheel 240 are installed, cable 902 in the front fork 220 is nearly completely covered to provide extended durability and protection from vandalism. Similar shielding may be employed at any exposed cable connection (e.g., brake connections, dynamo connections, locking system connections, light connections, etc.). FIG. 12B illustrates an example of front fork 220 with cable 902 running via hollow fork tubes 802. FIG. 12C illustrates an example of front fork 220 with cable 902 in slot 1204. FIG. 13 provides another example embodiment of the front fork 220 cable paths, including through hollow fork tube 802 and slots 1204 on both forks of the front fork 220.

Figure 14A:
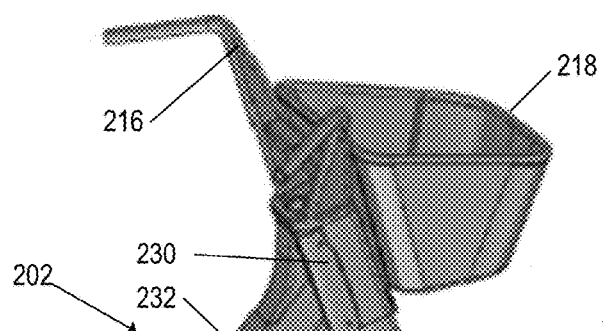
FIG. 14A is a side view of a chain stay integrated with the frame.
Figure 14B:
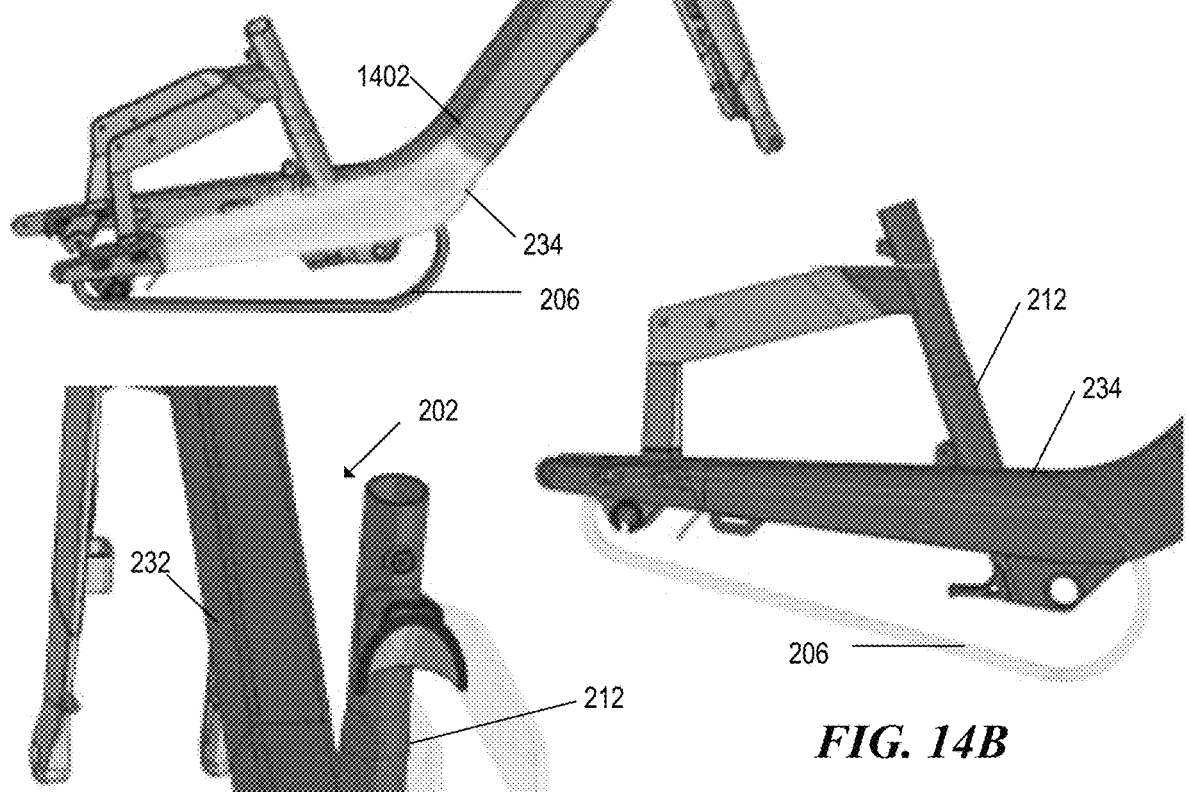
FIG. 14B is an isometric view of a chain stay integrated with the frame.
Figure 14C:
FIG. 14C is a rear isometric view of a chain stay integrated with the frame.

FIGS. 14A, 14B, and 14C provide various views of an example embodiment of an integrated chain stay 234. FIGS. 14A and 14B show a side view of chain stay 234. Chain stay 234 can connect into main tube 232 at connection 1402 and cover a top portion of drivetrain 206. Chain stay 234 has a dual function as a structural member of hollow frame 202 and a covering for the top half of the drivetrain 206, thereby functioning as a load bearing component and a safety feature. Chain stay 234 can be connected to seat tube 212. FIG. 14C is a rear isometric view of chain stay 234. FIG. 140 illustrates the path of drivetrain 206 through chain stay 234 and further illustrates the relative position of seat tube 212. Chain stay 234 can conceal cable 902.

Figure 15A:
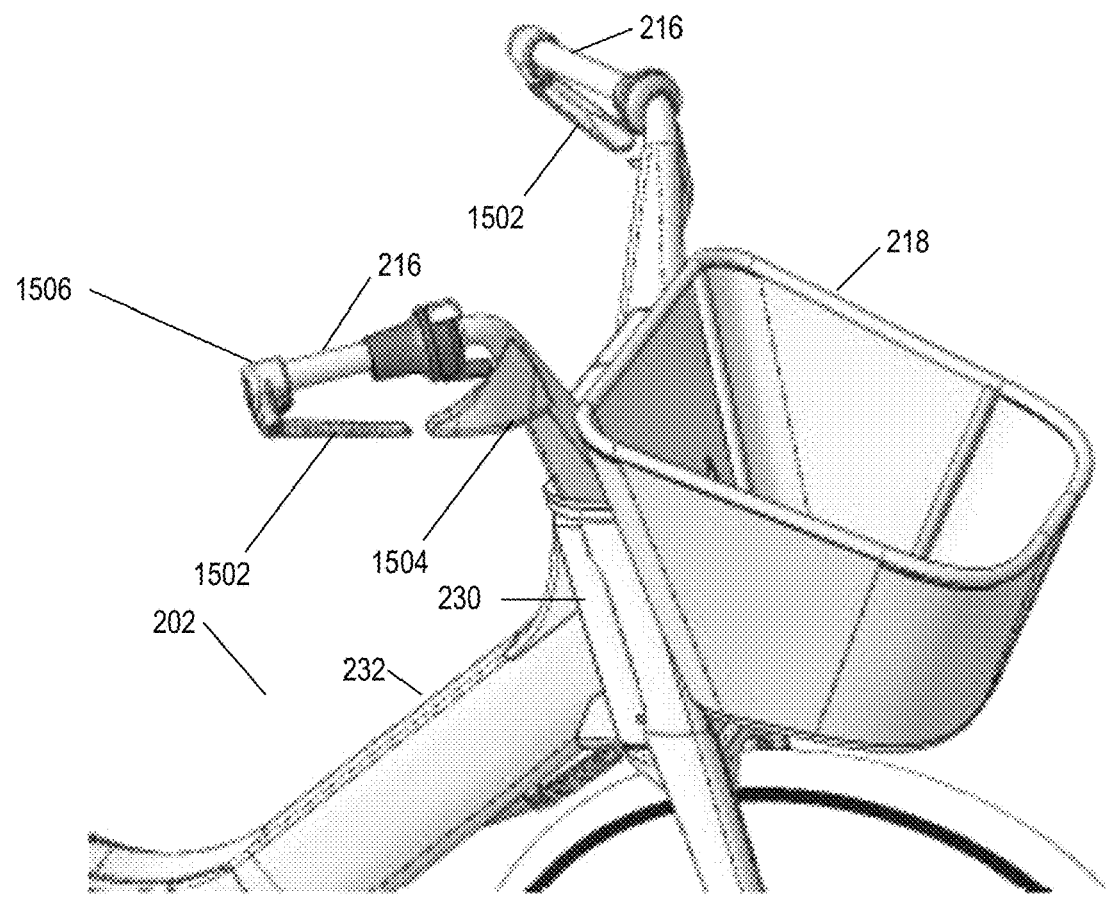
FIG. 15A is an isometric view of a reverse brake lever.
Figure 15B:
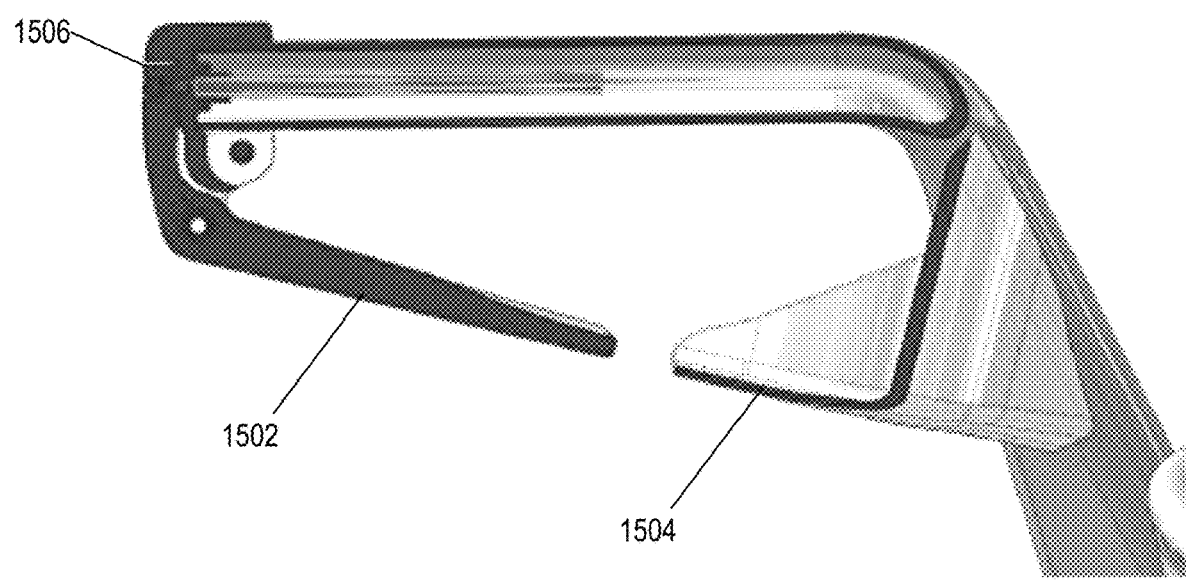
FIG. 15B is a rear view of a reverse brake lever and internal brake cable passages.

FIGS. 15A and 15B illustrate an example arrangement of the brake lever and internal brake cable run. As shown, forward facing "reverse" bicycle brake levers 1502 are provided and are paired with a shroud 1504 that completes the gestural form of the brake lever. Shroud 1504 can protect brake lever 1502 from catching on objects and provides a tamper-proof location for the cables of a shifter mechanism to transition into the head tube 230. This allows the covering of both the brake cable and shifter cable in one mechanism. Brake lever 1502 can be aligned with an end of handlebars 216. An endcap or base 1506 is coupled to a free end of one of the handlebars 216, and brake lever 1502 is pivotally coupled to base 1506. Base 1506 can include a brake cable routed internally through the handlebars 216 that is connected to an end of brake lever 1502 such that when pressure is applied to brake lever 1502 to bring brake lever 1502 closer to handlebars 216, the brake cable is shortened, thereby actuating the brake (not shown).

Figure 16A:
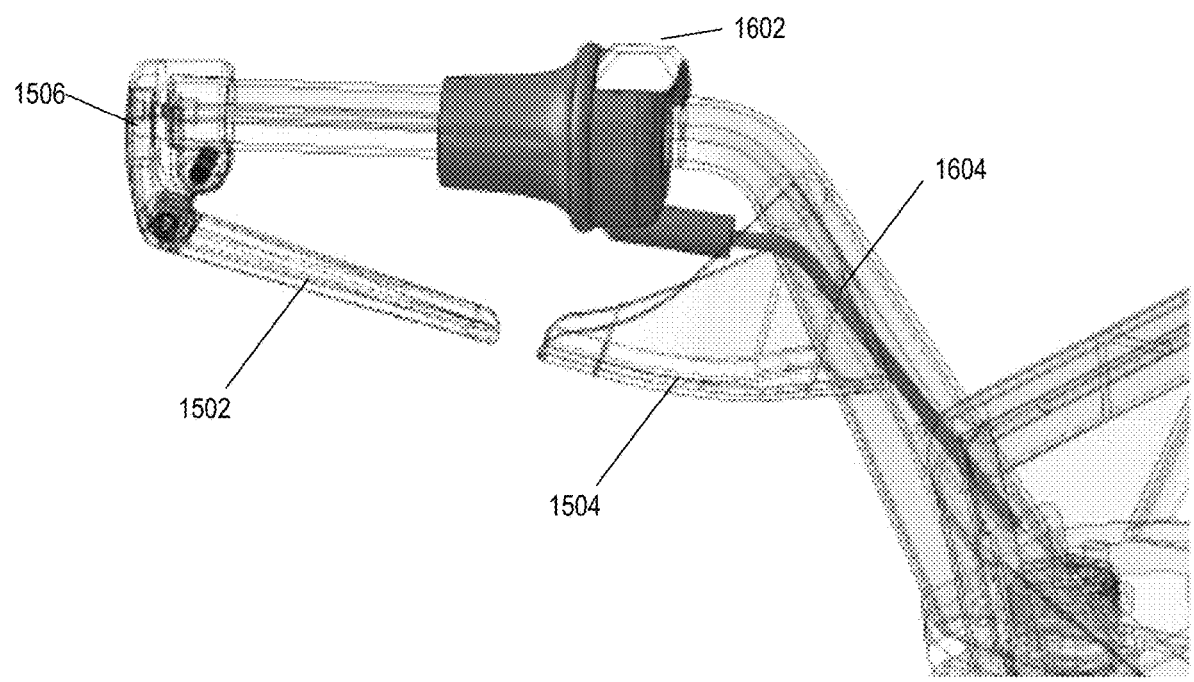
FIG. 16A is a front view of a reverse brake lever, internal shift cable passages, and a shroud.
Figure 16B:
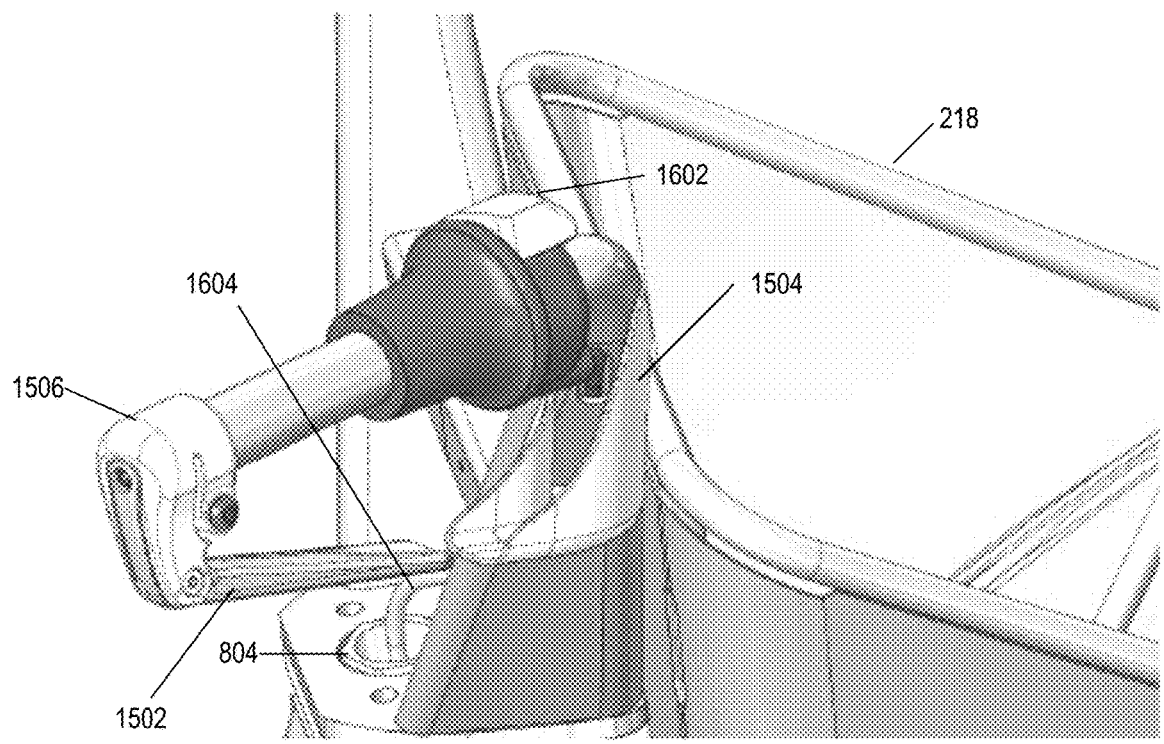
FIG. 16B is an isometric view of a reverse brake lever, internal shift cable passages, and a shroud.

FIGS. 16A and 16B illustrate a shifter cable run and the integrated reverse brake lever 1502, shifter 1602, and shroud 1504. As shown in FIG. 15B, shifter 1602 is coupled to shifter cable 1604, which passes through shroud 1504 and is used to switch gears. When a rider presses or moves shifter 1602, gears internal to the rear hub change for an internally geared bicycle, or the bicycle chain can be moved to different rear (and/or front) gears by tightening or relieving tension on springs by cables for an externally geared bicycle. Cables can extend from shifter 1602 to a front or rear wheel. In FIG. 16B, shifter cable 1604 (and/or a brake cable) extends through shroud 1504, the hollow headset compression nut 804 and into head tube 230. In operation, the passage of shifter cable 1604 and hollow headset compression nut 804 may be covered by an additional protective piece.

Figure 17A:
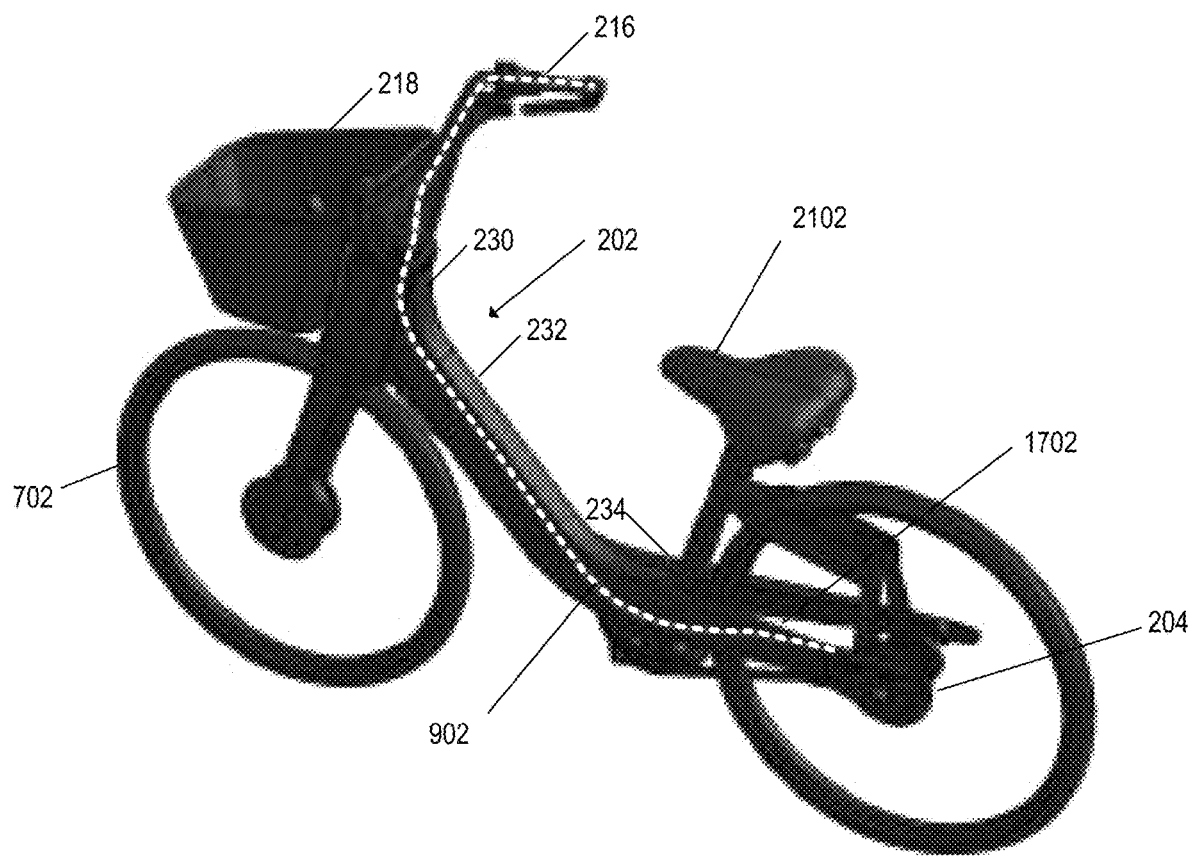
FIGS. 17A, 17B, 17C, and 17D illustrate example internal cable passages.
Figure 17B:
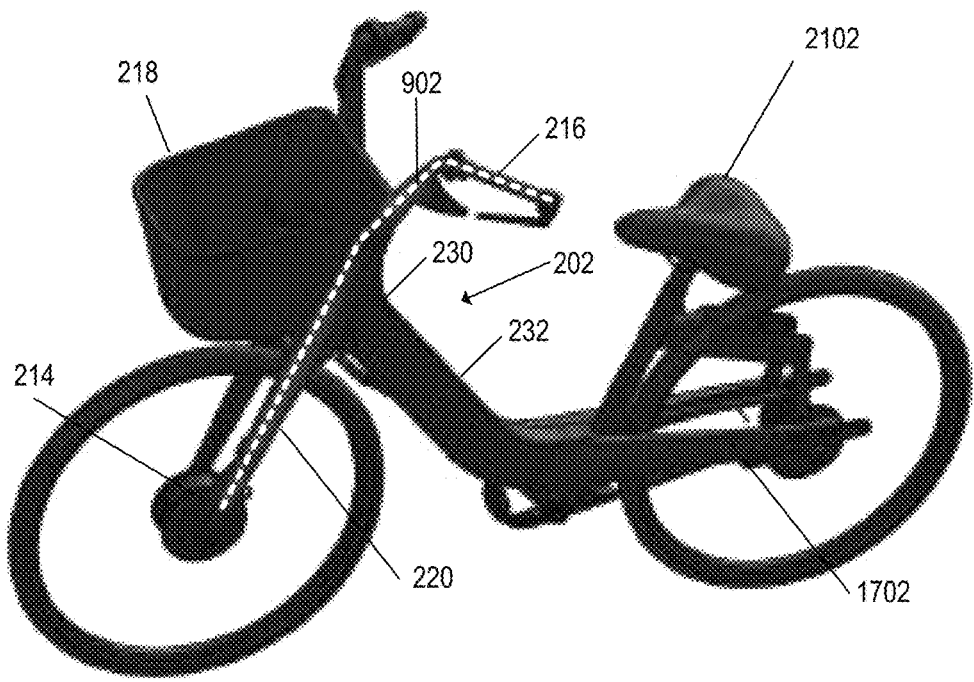
Figure 17C:
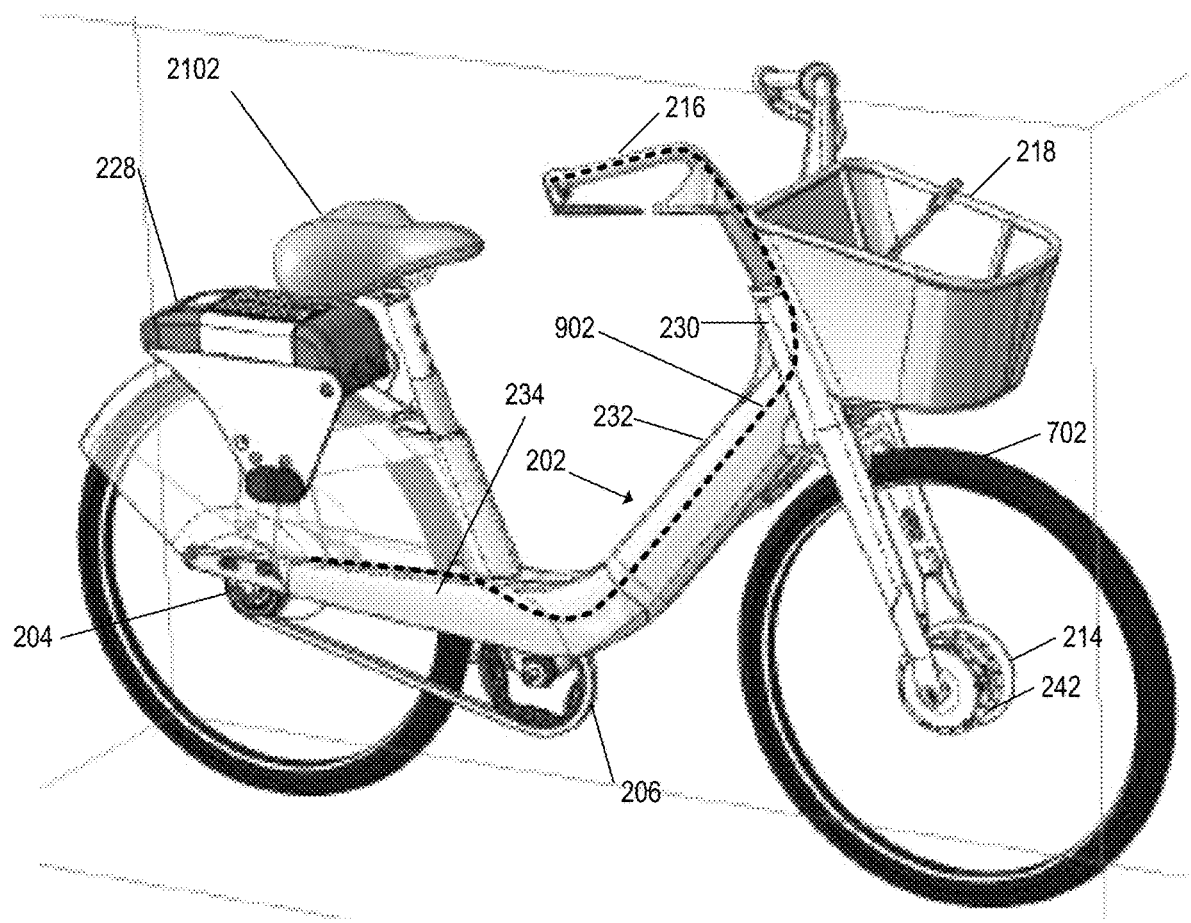
Figure 17D:
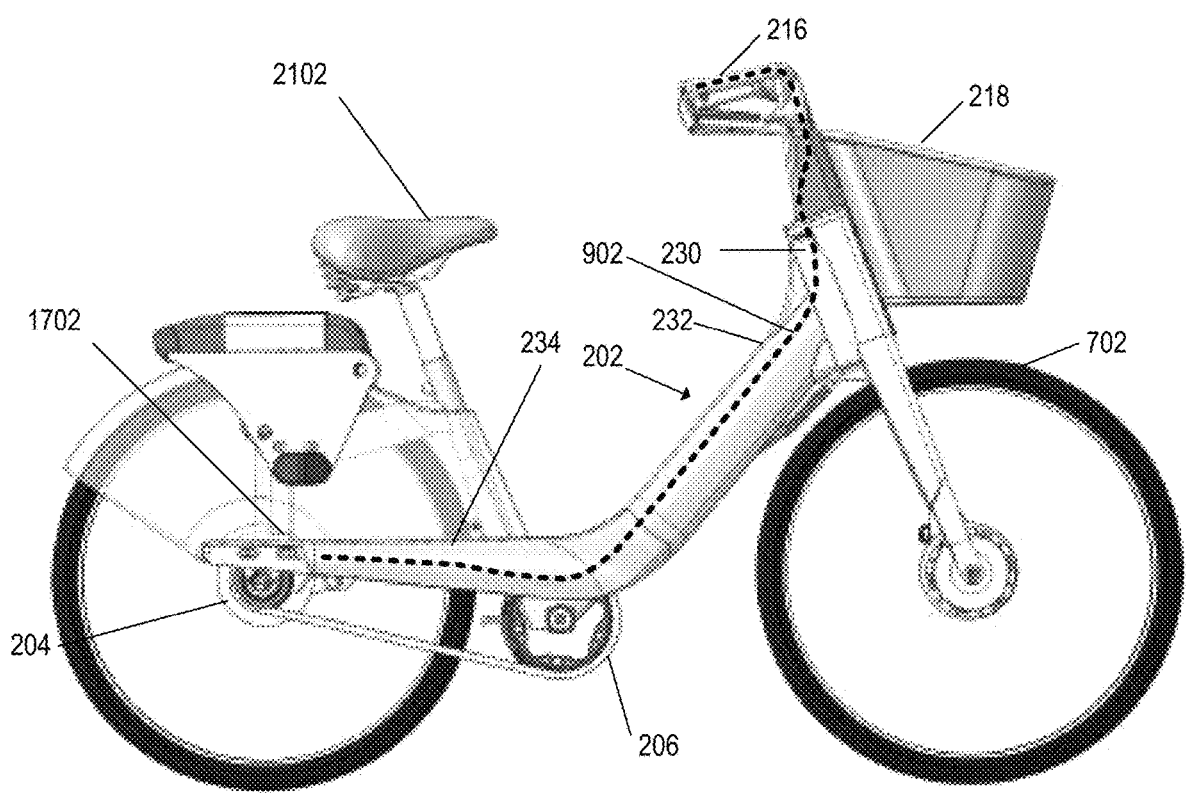

FIGS. 17A, 17B, 17C, and 17D illustrate with broken lines examples of internal cable runs. In FIGS. 17A, 17C, and 17D, cable 902 (e.g., brake cable and/or shift cable) can run from handlebars 216 (e.g., from brake lever 1502 or the shifter 1602) though head tube 230, along main tube 232 (and possibly through chain stay 234) to the rear fork 1702 and connecting with rear wheel hub 204. In some embodiments, cable 902 run may terminate at any point such as adjacent the rear wheel hub 204 to control a rear rim brake. Cable 902 run may terminate at the rear wheel hub 204 to control a rear wheel hub brake. Cable 902 may connect the battery to the locking mechanism, dynamo generator, solar power generator, or any other features.

FIG. 17B illustrates an example internal cable run wherein a cable 902 (e.g., brake cable and/or shift cable) runs from handlebars 216 (e.g., from brake lever 1502 or the shifter 1602) though head tube 230 and through front fork 220 (e.g., through hollow fork tubes 802 and slot 1204) and terminating at front wheel hub 214. In some embodiments, the cable run may terminate at any point such as adjacent the tire to control a front rim brake (not shown). Alternatively, the cable run may terminate at the front wheel hub 214 to control a front wheel hub brake. The cable may terminate at the front motor 242. (FIGS. 17A, 17C and 17D show similar cable runs for rear rim or hub brakes and for rear motor.) Cables may connect the rechargeable battery 402 to the electronic locking and control system 228, dynamo generator, solar power generator, or any other features. Cables may also connect the solar power generator and the dynamo generator to rechargeable battery 402 for recharging using solar energy and/or energy collected from the user pedaling. Rechargeable battery 402 can provide power via cables to electronic locking and control system 228, one or more motors such as a front motor 242, lights, or other components. It will be appreciated that the cable runs illustrated in the figures are examples only and that other cable runs are possible. For example, a cable may run from the internal battery compartment in main tube 232 through head tube 230 and into the front fork 220. A cable may run internally from the dynamo generator to the front or rear lights. A cable may run internally from the dynamo or solar power generators to the internal battery compartment. A cable may run internally from the internal battery compartment to the electronic locking and control system 228.

FIGS. 18, 19, and 20 illustrate an example of a bicycle frame construction that mounts a modular electronic locking and control system 228 onto the seatstays 2002 of hollow frame 202. This allows for easy maintenance of the electronic locking and control system 228 by allowing the entire electronic locking and control system 228 to be easily swapped out and replaced as a unit. The electronic locking and control system 228 may include one or more of the following features: an RFID/NFC communications capability to identify the bike frame and/or the electronic locking and control system 228; wireless network connectivity; GPS tracking; an LED or LCD touch screen interface 2004; a keypad interface; audible alarms; a solar panel power generator 2006; an internal battery; electrical and electronic control connections with the internal battery and internal control processors housed in the internal battery housing of main tube 232 of the hollow frame 202; dedicated control processors; a mechanical interlock for immobilizing the rear wheel; and a U-bar security lock for securing the bicycle to a bike rack or post. Solar panels 2006 can be mounted on an upper surface of the modular electronic locking and control system 228 and can be positioned directly, or near directly, above rear wheel hub 204. LED or LED touch screen interface 2004 can be positioned proximate to solar panels 2006, away from seat 2102. A lock that can be used on an electric assist bicycle is described in commonly-assigned U.S. Provisional Application 62/647,337, entitled "LOCK ASSEMBLY FOR SECURING A WHEELED VEHICLE," which is hereby incorporated by reference in its entirety for all purposes.

Figure 21:
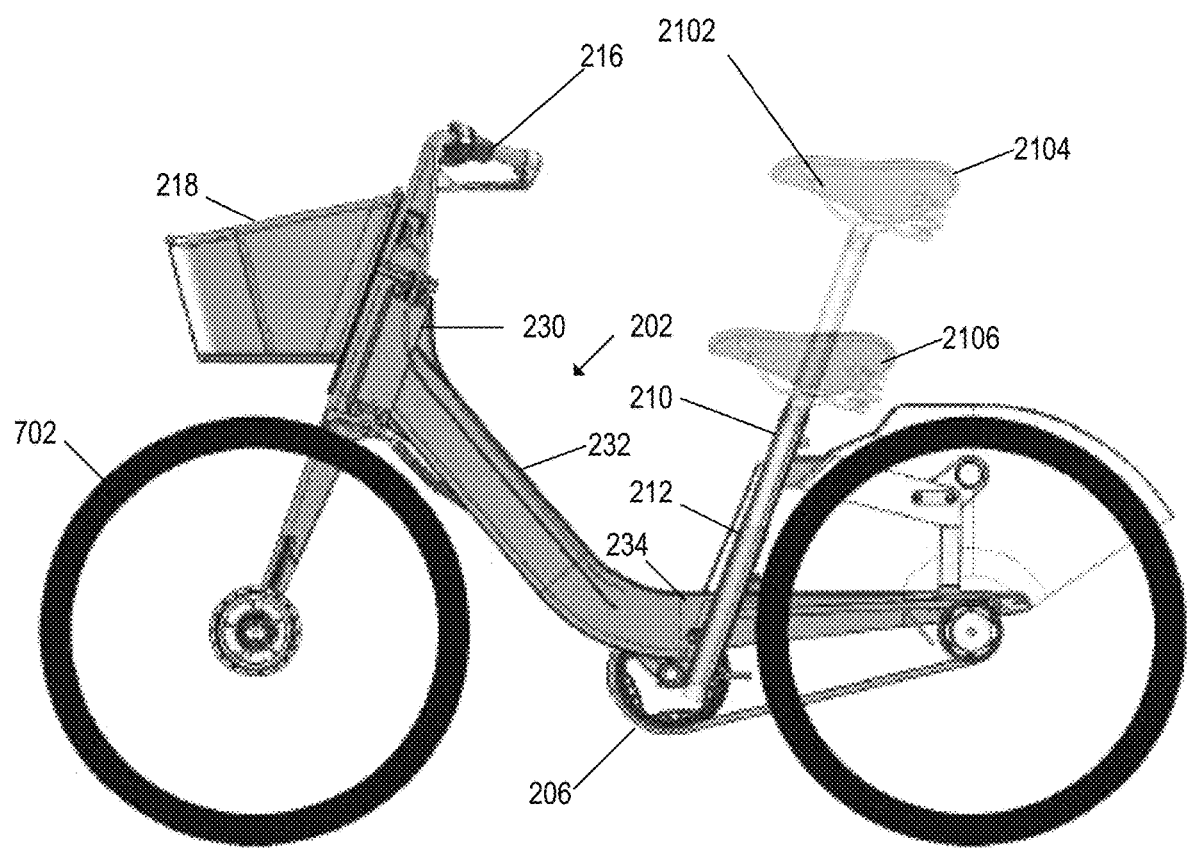
FIG. 21 is a side view of an adjustable seat post.
Figure 22:
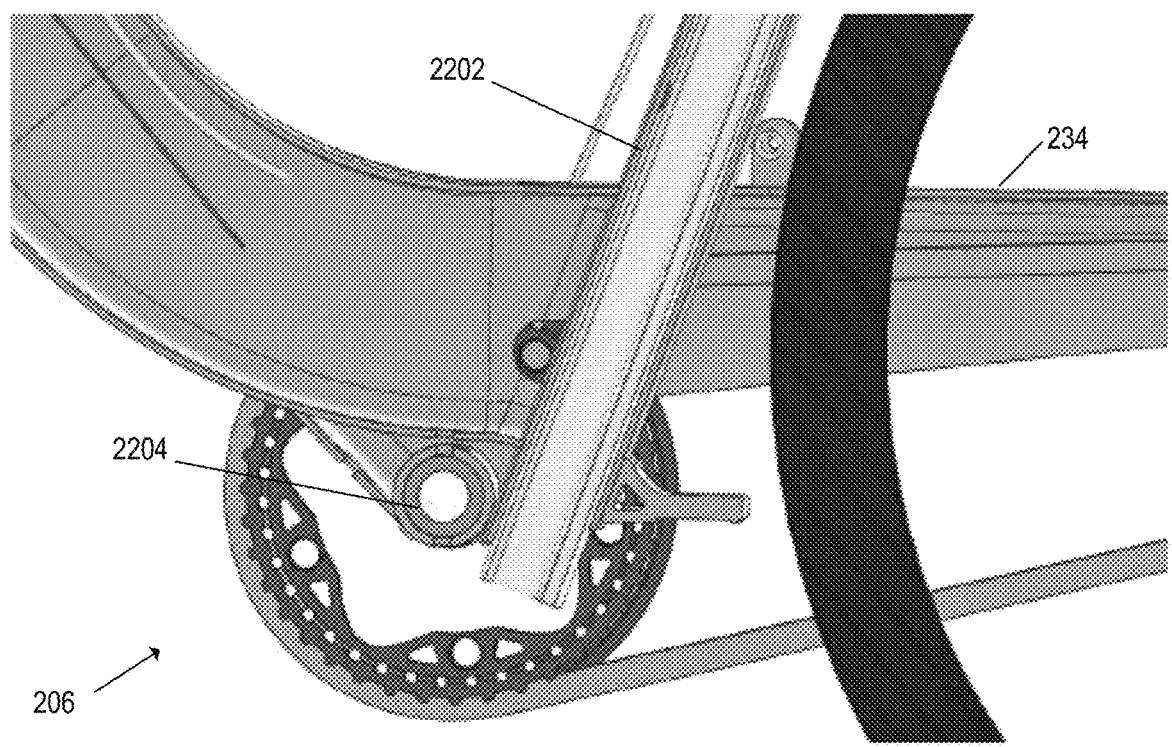
FIG. 22 is a side view of a lower portion of a seat post and a bottom bracket.
Figure 23:
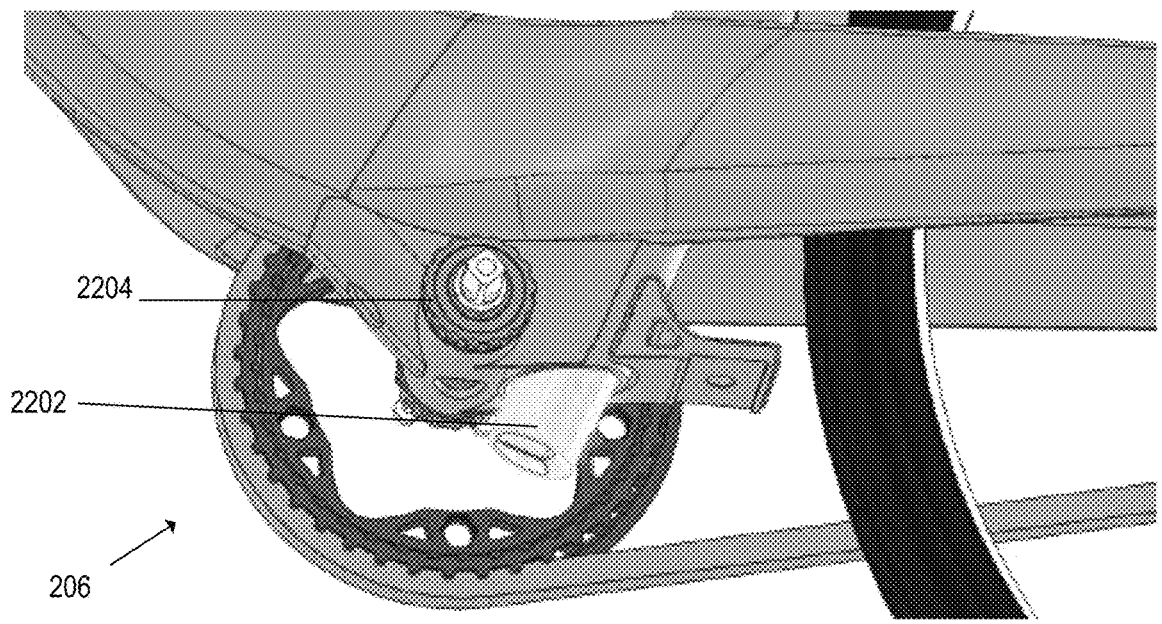
FIG. 23 is an isometric view of a seat post and bottom bracket.

FIGS. 21, 22, and 23 illustrate yet another feature of an example embodiment of the present technology. An extended adjustable seat post 210 is provided such that an extended range of rider sitting heights are possible. For example, as shown in FIG. 21, seat 2102 can be adjusted to seat position 2104, accommodating a rider of taller stature, and seat 2102 can be adjusted to second seat position 2106, accommodating a rider of shorter stature. Seat 2102 is coupled to seat post 210. To adjust seat 2102, seat post 210 (which is received into seat tube 212 and extends through an aperture in seat tube 212) can be moved. FIG. 22 is a cross-section of seat post 210 and FIG. 23 is a side view of seat post 210. As shown in FIGS. 22 and 23, seat tube 212 of the bicycle is set behind the center of the bottom bracket 2202 allowing seat post 210 to have an extended range to accommodate a wide range of riders. The bottom of seat post 210 can slide below the center axis of the bottom bracket 2202.

Other configurations and embodiments of the present technology are possible and provide an electric assist bicycle suitable for both personal and public use.

From the foregoing, it will be appreciated that specific embodiments of the technology have been described herein for purposes of illustration, but that various modifications may be made without deviating from the scope of the invention. The teachings of the invention provided herein can be applied to other systems, not necessarily the bicycle described above. The elements of the various examples described above can be combined to provide further implementations of the invention. Some alternative implementations of the invention may include not only additional elements to those implementations noted above, but also may include fewer elements. Accordingly, the technology is not limited except as by the appended claims.

The above description, drawings, and appendices are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various features are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. sec. 112(f), other aspects may likewise be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

We claim:

1. An electric assist bicycle comprising:
   a hollow frame having a hollow main tube connected between a hollow head tube and a hollow chain stay, wherein the head tube couples to handlebars;
   a hollow front fork rotatably coupled to the hollow frame;
   a front wheel rotatably coupled to the hollow front fork;
   a rear wheel rotatably coupled to the hollow chain stay,
   wherein a continuous passage is defined from an opening in the head tube to an opening in the chain stay proximate to the rear wheel, from the opening in the head tube to an opening in the hollow front fork proximate to the front wheel, or both from the opening in the head tube to the opening in the chain stay proximate to the rear wheel and from the opening in the head tube to the opening in the hollow front fork proximate to the front wheel;
   electric assist components coupled to the frame;
   one or more cables routed within the hollow frame through the continuous passage;
   a rechargeable battery, and
   an electronic locking and control system, including a location tracking system,
   wherein the one or more cables connects the rechargeable battery to the electronic locking and control system.

2. The electric assist bicycle of claim 1, further comprising:
   a front wheel hub within the front wheel,
   wherein the one or more cables are routed from the handlebars, through the continuous passage and through a slot in the hollow front fork to terminate at the front wheel hub.

3. The electric assist bicycle of claim 2, wherein the one or more cables are covered by a cable shield between the hollow front fork and the front wheel hub.

4. The electric assist bicycle of claim 1, further comprising a rear wheel hub within the rear wheel, and
   wherein the one or more cables extend through the continuous passage and terminate at the rear wheel hub.

5. The electric assist bicycle of claim 1, wherein the handlebars include a brake lever, and
   wherein the one or more cables is a brake cable that is connected to the brake lever and routed internally through the handlebars, and
   wherein the brake lever is pivotably coupled to a free end of the handlebars.

6. The electric assist bicycle of claim 1, wherein the rechargeable battery passes through the head tube to an internal battery compartment positioned within the hollow frame, and
   wherein the rechargeable battery is accessed through an access panel connected to the head tube.

7. The electric assist bicycle of claim 6, wherein the rechargeable battery passes through an aperture in the hollow front fork, and wherein the electric assist components include a motor coupled to the rechargeable battery and located in a front wheel hub of the front wheel.

8. The electric assist bicycle of claim 1, further comprising:
   a seat,
   a seat tube,
   a seat post adapted to adjust a height of the seat, and
   a bottom bracket,
   wherein the seat post is received into the seat tube and extends through an aperture in the seat tube, and
   wherein a lower end of the seat post is positionable below the bottom bracket.

9. The electric assist bicycle of claim 1, further comprising a drivetrain,
   wherein the drivetrain is routed through the hollow chain stay.

10. The electric assist bicycle of claim 1, wherein the electronic locking and control system further includes a solar power generator and a touch screen interface.

11. A bicycle comprising:
    a frame;
    front and rear wheels supporting the frame;
    handlebars rotatably coupled to the frame and configured to rotate the front wheel;
    an endcap coupled to a free end of the handlebars;
    a brake lever pivotally coupled to the endcap to pivot at the endcap and inwardly and toward the handlebars;
    a brake cable;
    a front fork; and
    a front wheel hub,
    wherein the brake cable is connected to an end of the brake lever,
    wherein the brake cable is routed internally through the handlebars and the frame, and
    wherein the brake cable is routed through a slot in the front fork and terminates at the front wheel hub.

12. The bicycle of claim 11, wherein the brake cable is covered by a cable shield between the front fork and the front wheel hub.

13. The bicycle of claim 11, further comprising:
    a rear fork, and
    a rear wheel hub,
    wherein the frame includes a hollow frame having a head tube and a main tube, and
    wherein the brake cable is routed through the head tube and the main tube to the rear fork to connect to the rear wheel hub.

14. The bicycle of claim 11, further comprising:
    a shifter, and
    a shroud,
    wherein,
    the shifter is coupled to cables that extend from the shifter to the frame, wherein the shroud covers the cables as the cables transition from the shifter to the frame, and wherein a free end of the brake lever is partially covered by the shroud to prevent the brake lever from catching on objects.

15. An electric assist bicycle comprising:

a hollow frame;

a rechargeable battery received into an internal battery compartment in the hollow frame;

an electronic locking and control system, wherein the hollow frame comprises a head tube and a main tube, wherein the rechargeable battery is received through a front opening of the head tube and into the main tube, and wherein one or more cables extend internally through the hollow frame from the rechargeable battery to the electronic locking and control system.

16. The electric assist bicycle of claim 15, further comprising a front basket, wherein the basket includes an access panel proximate to the head tube, wherein the rechargeable battery is accessed through the access panel, and wherein the access panel is removably connected to the head tube.

17. The electric assist bicycle of claim 15, further comprising a front fork connected to the head tube, wherein the rechargeable battery passes through an aperture in the front fork.

18. The electric assist bicycle of claim 15, further comprising electric assist components, wherein the electric assist components include a motor coupled to the rechargeable battery and located in a front wheel hub of a front wheel.

* * * * *